(12) United States Patent
Sarkis et al.

(10) Patent No.: US 12,457,083 B2
(45) Date of Patent: Oct. 28, 2025

(54) FEEDBACK FOR SIDELINK TRANSMISSIONS

(71) Applicant: QUALCOMM Incorporated, San Diego, CA (US)

(72) Inventors: Gabi Sarkis, San Diego, CA (US); Guangyi Liu, San Diego, CA (US); Sony Akkarakaran, Poway, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 17/586,570

(22) Filed: Jan. 27, 2022

(65) Prior Publication Data

US 2023/0239118 A1 Jul. 27, 2023

(51) Int. Cl.
*H04L 5/00* (2006.01)
*H04W 72/044* (2023.01)

(52) U.S. Cl.
CPC ......... *H04L 5/0055* (2013.01); *H04W 72/044* (2013.01)

(58) Field of Classification Search
CPC .................... H04L 5/0055; H04W 72/044
USPC .............................................. 370/329
See application file for complete search history.

(56) References Cited

U.S. PATENT DOCUMENTS

| | | | |
|---|---|---|---|
| 2020/0344722 A1* | 10/2020 | He | H04W 72/0446 |
| 2021/0028910 A1* | 1/2021 | Cheng | H04L 5/0064 |
| 2021/0136781 A1* | 5/2021 | Hosseini | H04L 1/1854 |
| 2021/0320759 A1* | 10/2021 | Lee | H04L 1/1896 |
| 2022/0095279 A1* | 3/2022 | Hwang | H04L 27/2602 |

* cited by examiner

*Primary Examiner* — Nicholas R Taylor
*Assistant Examiner* — Chong G Kim
(74) *Attorney, Agent, or Firm* — Harrity & Harrity, LLP / Qualcomm

(57) ABSTRACT

Various aspects of the present disclosure generally relate to wireless communication. In some aspects, a user equipment (UE) may receive a sidelink transmission that includes a transport block, and may transmit sidelink feedback, for each of a plurality of code block groups included in the transport block, in respective physical sidelink feedback channel (PSFCH) resources. In some aspects, a UE may receive a sidelink transmission that spans a plurality of slots, and may transmitting, for the sidelink transmission, sidelink feedback in at least one of: first one or more PSFCH resources that occur during the sidelink transmission, or second one or more PSFCH resources that occur after the sidelink transmission. Numerous other aspects are provided.

30 Claims, 19 Drawing Sheets

FEEDBACK FOR SIDELINK TRANSMISSIONS

FIELD OF THE DISCLOSURE

Aspects of the present disclosure generally relate to wireless communication and to techniques and apparatuses for feedback for sidelink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a sidelink transmission that includes a transport block. The method may include transmitting sidelink feedback, for each of a plurality of code block groups included in the transport block, in respective physical sidelink feedback channel (PSFCH) resources.

Some aspects described herein relate to a method of wireless communication performed by a UE. The method may include transmitting a sidelink transmission that includes a transport block. The method may include receiving sidelink feedback, for each of a plurality of code block groups included in the transport block, in respective PSFCH resources.

Some aspects described herein relate to a method of wireless communication performed by a UE. The method may include receiving a sidelink transmission that spans a plurality of slots. The method may include transmitting, for the sidelink transmission, sidelink feedback in at least one of: first one or more PSFCH resources that occur during the sidelink transmission, or second one or more PSFCH resources that occur after the sidelink transmission.

Some aspects described herein relate to a method of wireless communication performed by a UE. The method may include transmitting a sidelink transmission that spans a plurality of slots. The method may include receiving, for the sidelink transmission, sidelink feedback in at least one of: first one or more PSFCH resources that occur during the sidelink transmission, or second one or more PSFCH resources that occur after the sidelink transmission.

Some aspects described herein relate to a UE for wireless communication. The user equipment may include a memory and one or more processors coupled to the memory. The one or more processors may be configured to receive a sidelink transmission that includes a transport block. The one or more processors may be configured to transmit sidelink feedback, for each of a plurality of code block groups included in the transport block, in respective PSFCH resources.

Some aspects described herein relate to a UE for wireless communication. The UE may include a memory and one or more processors coupled to the memory. The one or more processors may be configured to transmit a sidelink transmission that includes a transport block. The one or more processors may be configured to receive sidelink feedback, for each of a plurality of code block groups included in the transport block, in respective PSFCH resources.

Some aspects described herein relate to a UE for wireless communication. The UE may include a memory and one or more processors coupled to the memory. The one or more processors may be configured to receive a sidelink transmission that spans a plurality of slots. The one or more processors may be configured to transmit, for the sidelink transmission, sidelink feedback in at least one of: first one or more PSFCH resources that occur during the sidelink transmission, or second one or more PSFCH resources that occur after the sidelink transmission.

Some aspects described herein relate to a UE for wireless communication. The UE may include a memory and one or more processors coupled to the memory. The one or more processors may be configured to transmit a sidelink transmission that spans a plurality of slots. The one or more processors may be configured to receive, for the sidelink transmission, sidelink feedback in at least one of: first one or more PSFCH resources that occur during the sidelink transmission, or second one or more PSFCH resources that occur after the sidelink transmission.

Some aspects described herein relate to a non-transitory computer-readable medium that stores a set of instructions for wireless communication by a UE. The set of instructions, when executed by one or more processors of the UE, may cause the UE to receive a sidelink transmission that includes a transport block. The set of instructions, when executed by one or more processors of the UE, may cause the UE to transmit sidelink feedback, for each of a plurality of code block groups included in the transport block, in respective PSFCH resources.

Some aspects described herein relate to a non-transitory computer-readable medium that stores a set of instructions for wireless communication by a UE. The set of instructions, when executed by one or more processors of the UE, may cause the one or more the UE to transmit a sidelink transmission that includes a transport block. The set of instructions, when executed by one or more processors of the UE, may cause the UE to receive sidelink feedback, for each of a plurality of code block groups included in the transport block, in respective PSFCH resources.

Some aspects described herein relate to a non-transitory computer-readable medium that stores a set of instructions for wireless communication by a UE. The set of instructions, when executed by one or more processors of the UE, may cause the UE to receive a sidelink transmission that spans a plurality of slots. The set of instructions, when executed by one or more processors of the UE, may cause the UE to transmit, for the sidelink transmission, sidelink feedback in at least one of one or more PSFCH resources that occur during the sidelink transmission or second one or more PSFCH resources that occur after the sidelink transmission.

Some aspects described herein relate to a non-transitory computer-readable medium that stores a set of instructions for wireless communication by a UE. The set of instructions, when executed by one or more processors of the UE, may cause the UE to transmit a sidelink transmission that spans a plurality of slots. The set of instructions, when executed by one or more processors of the UE, may cause the UE to receive, for the sidelink transmission, sidelink feedback in at least one of one or more PSFCH resources that occur during the sidelink transmission or second one or more PSFCH resources that occur after the sidelink transmission.

Some aspects described herein relate to an apparatus for wireless communication. The apparatus may include means for receiving a sidelink transmission that includes a transport block. The apparatus may include means for transmitting sidelink feedback, for each of a plurality of code block groups included in the transport block, in respective PSFCH resources.

Some aspects described herein relate to an apparatus for wireless communication. The apparatus may include means for transmitting a sidelink transmission that includes a transport block. The apparatus may include means for receiving sidelink feedback, for each of a plurality of code block groups included in the transport block, in respective PSFCH resources.

Some aspects described herein relate to an apparatus for wireless communication. The apparatus may include means for receiving a sidelink transmission that spans a plurality of slots. The apparatus may include means for transmitting, for the sidelink transmission, sidelink feedback in at least one of: first one or more PSFCH resources that occur during the sidelink transmission, or second one or more PSFCH resources that occur after the sidelink transmission.

Some aspects described herein relate to an apparatus for wireless communication. The apparatus may include means for transmitting a sidelink transmission that spans a plurality of slots. The apparatus may include means for receiving, for the sidelink transmission, sidelink feedback in at least one of: first one or more PSFCH resources that occur during the sidelink transmission, or second one or more PSFCH resources that occur after the sidelink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
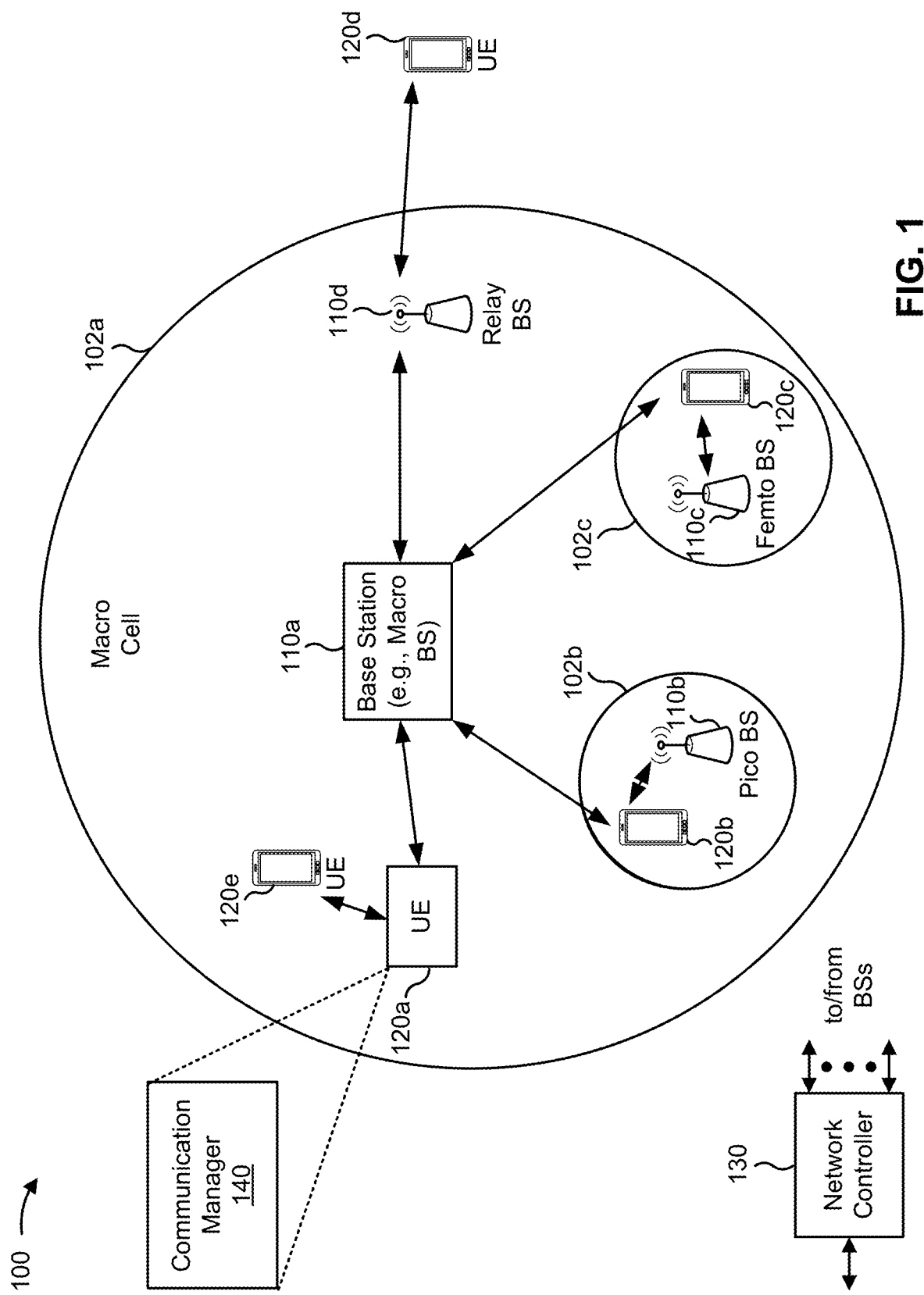
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a sidelink transmission that includes a transport block; and transmit sidelink feedback, for each of a plurality of code block groups included in the transport block, in respective PSFCH resources. As described in more detail elsewhere herein, the communication manager 140 may transmit a sidelink transmission that includes a transport block; and receive sidelink feedback, for each of a plurality of code block groups included in the transport block, in respective PSFCH resources. As described in more detail elsewhere herein, the communication manager 140 may receive a sidelink transmission that spans a plurality of slots; and transmit, for the sidelink transmission, sidelink feedback in at least one of: first one or more PSFCH resources that occur during the sidelink transmission, or second one or more PSFCH resources that occur after the sidelink transmission. As described in more detail elsewhere herein, the communication manager 140 may transmit a sidelink transmission that spans a plurality of slots; and receive, for the sidelink transmission, sidelink feedback in at least one of: first one or more PSFCH resources that occur during the sidelink transmission, or second one or more PSFCH resources that occur after the sidelink transmission. Additionally, or alternatively, the communication manager 140 may perform one or more other operations described herein.

As indicated above, FIG. 1 is provided as an example. Other examples may differ from what is described with regard to FIG. 1.

Figure 2:
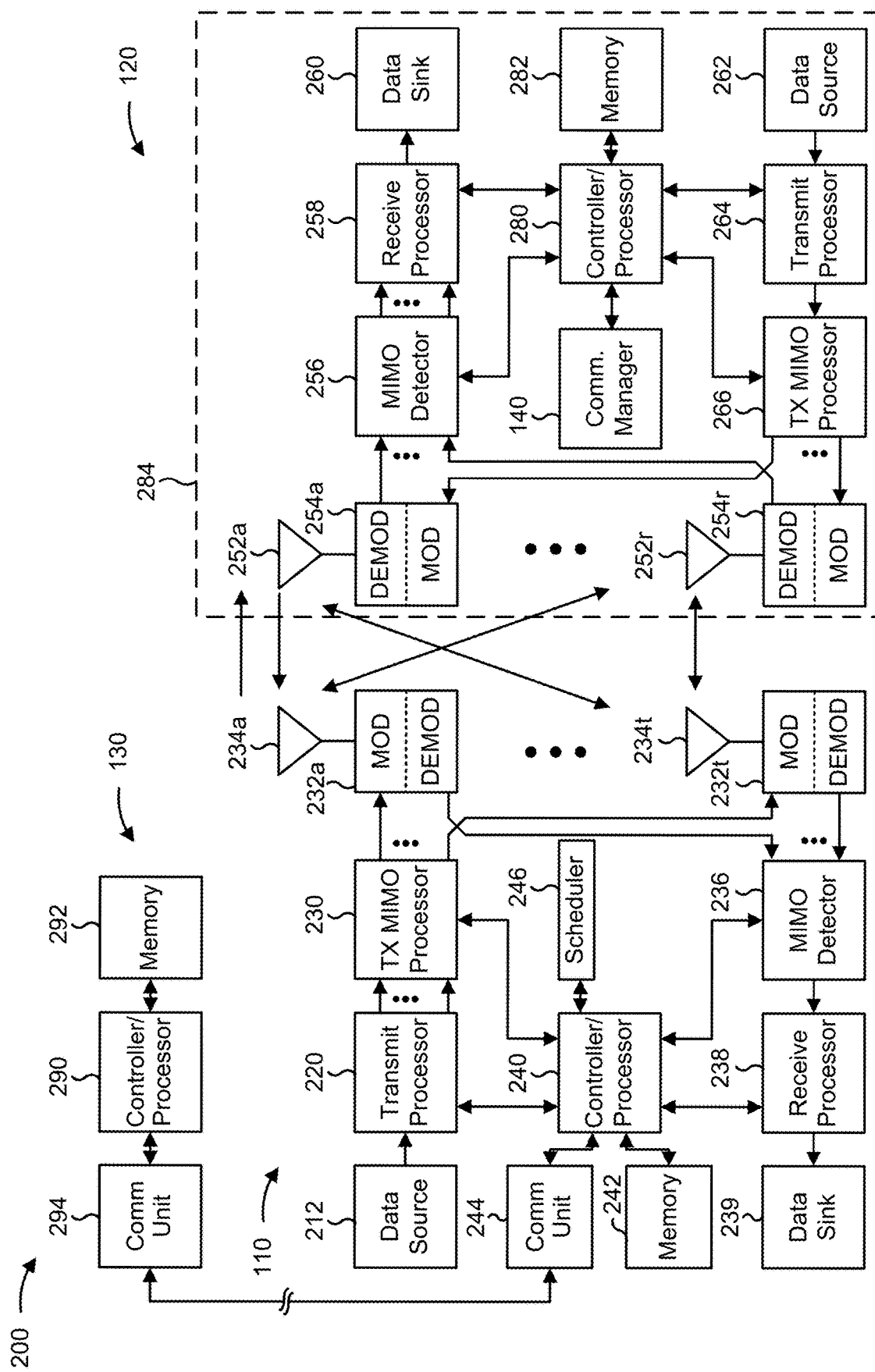
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-17).

The controller/processor 240 of the base station 110, the controller/processor 280 of the UE 120, and/or any other component(s) of FIG. 2 may perform one or more techniques associated with feedback for sidelink transmissions, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for receiving a sidelink transmission that includes a transport block; and/or means for transmitting sidelink feedback, for each of a plurality of code block groups included in the transport block, in respective PSFCH resources. In some aspects, the UE 120 includes means for transmitting a sidelink transmission that includes a transport block; and/or means for receiving sidelink feedback, for each of a plurality of code block groups included in the transport block, in respective PSFCH resources. In some aspects, the UE 120 includes means for receiving a sidelink transmission that spans a plurality of slots; and/or means for transmitting, for the sidelink transmission, sidelink feedback in at least one of: first one or more PSFCH resources that occur during the sidelink transmission, or second one or more PSFCH resources that occur after the sidelink transmission. In some aspects, the UE 120 includes means for transmitting a sidelink transmission that spans a plurality of slots; and/or means for receiving, for the sidelink transmission, sidelink feedback in at least one of: first one or more PSFCH resources that occur during the sidelink transmission, or second one or more PSFCH resources that occur after the sidelink transmission. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
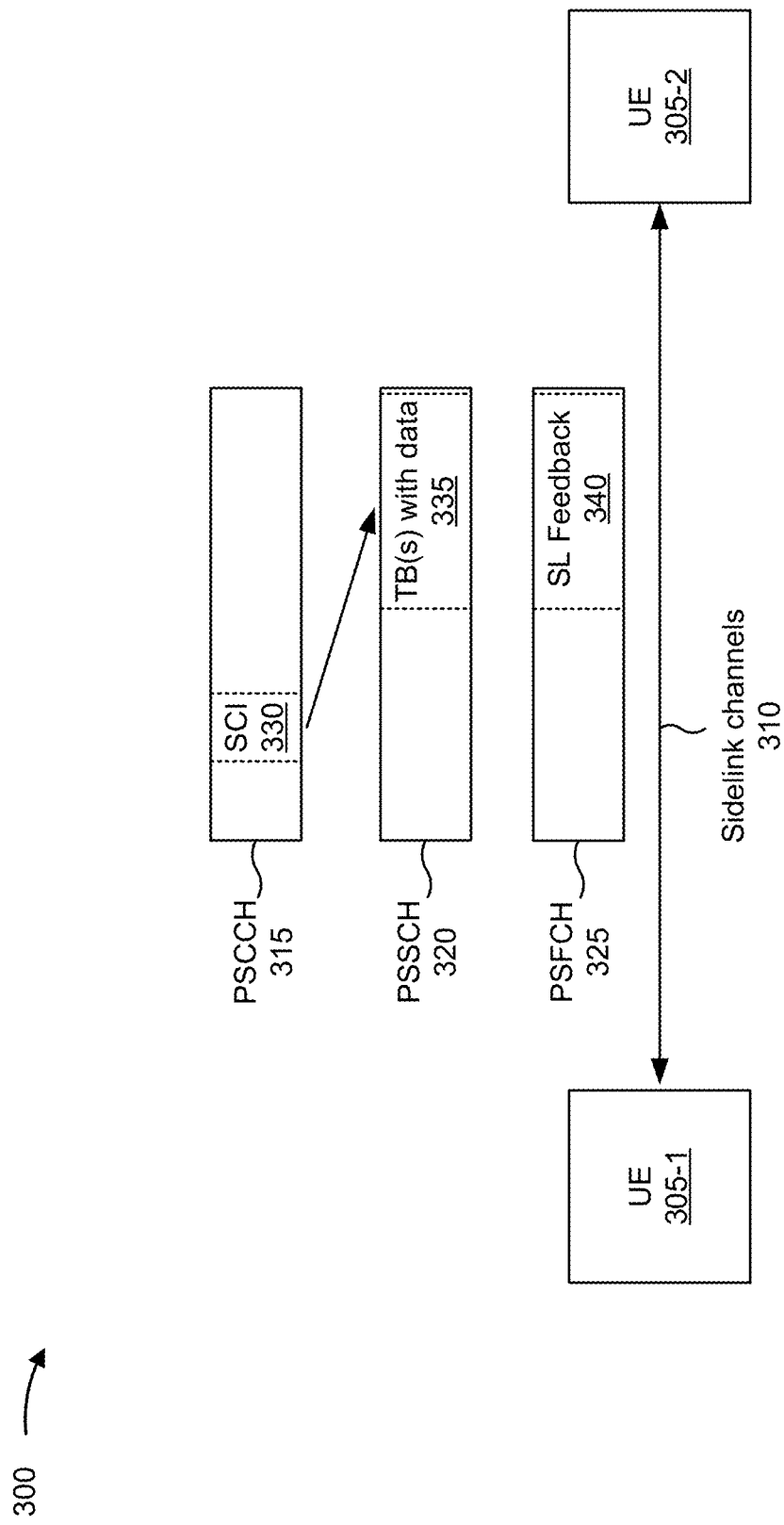
FIGS. 3 and 4 are diagrams illustrating examples of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include information for detecting and/or decoding the PSSCH 320. For example, the SCI-2 may include an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
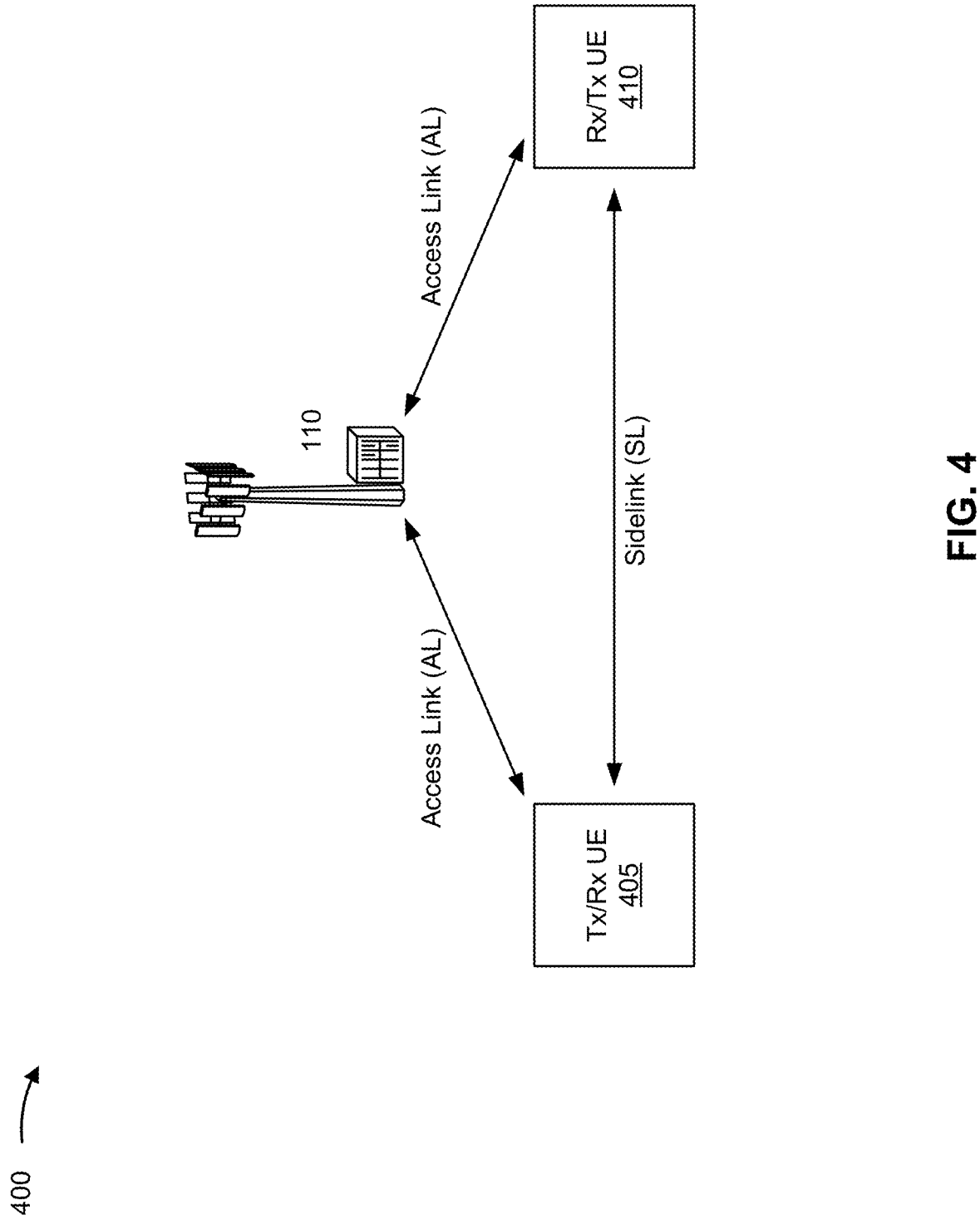

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
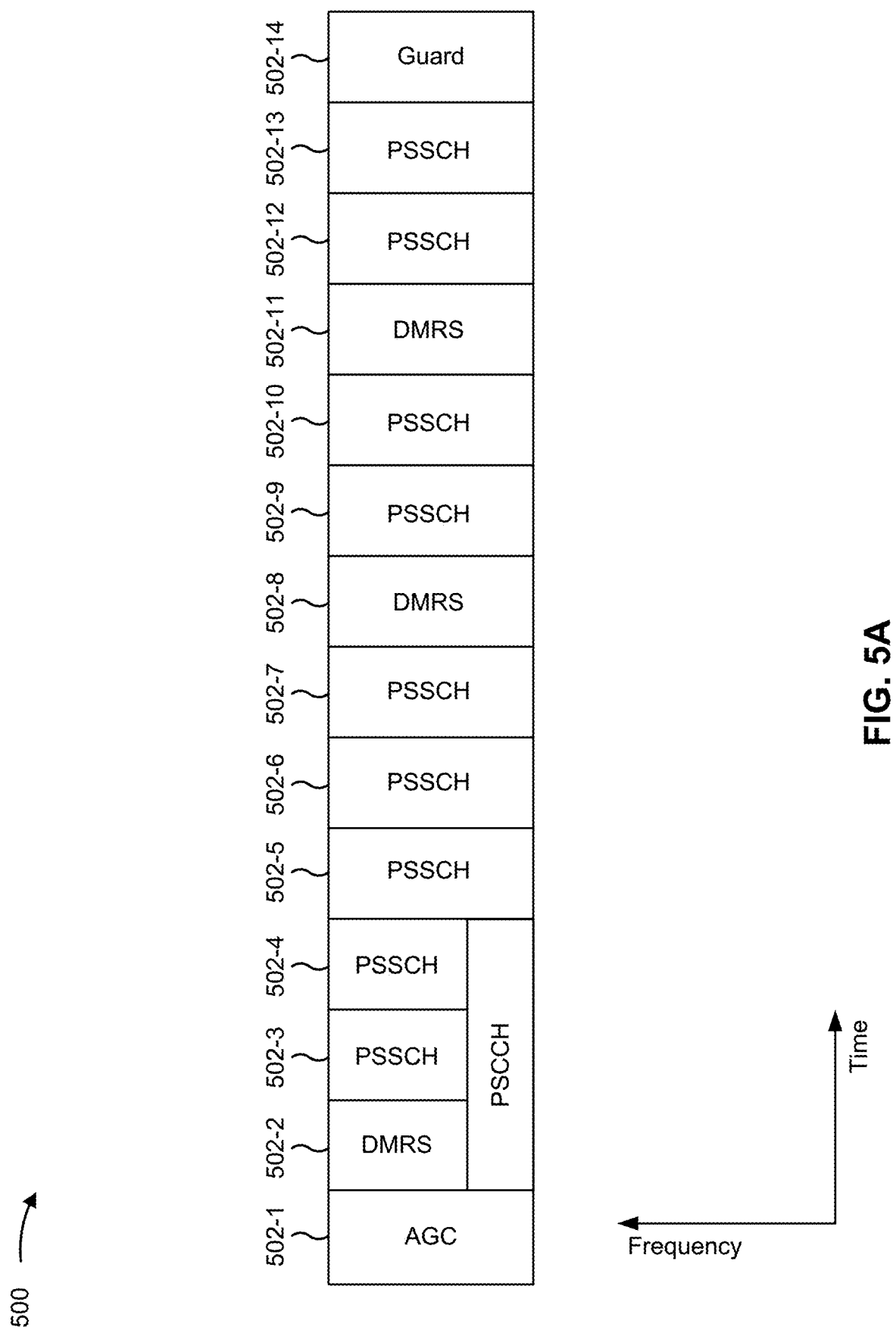
FIGS. 5A-5C are diagrams illustrating example slot configurations, in accordance with the present disclosure.
Figure 5B:
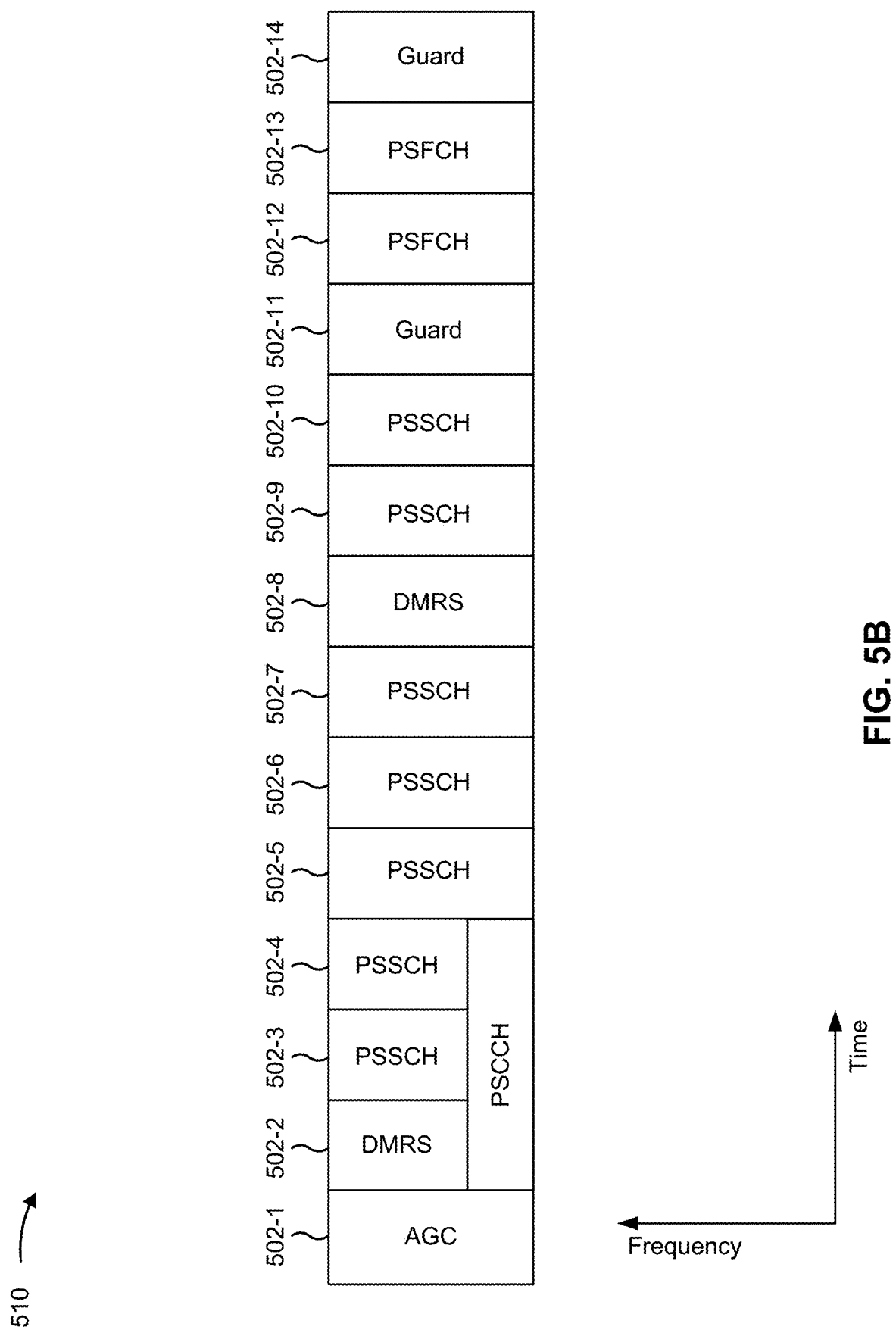
Figure 5C:
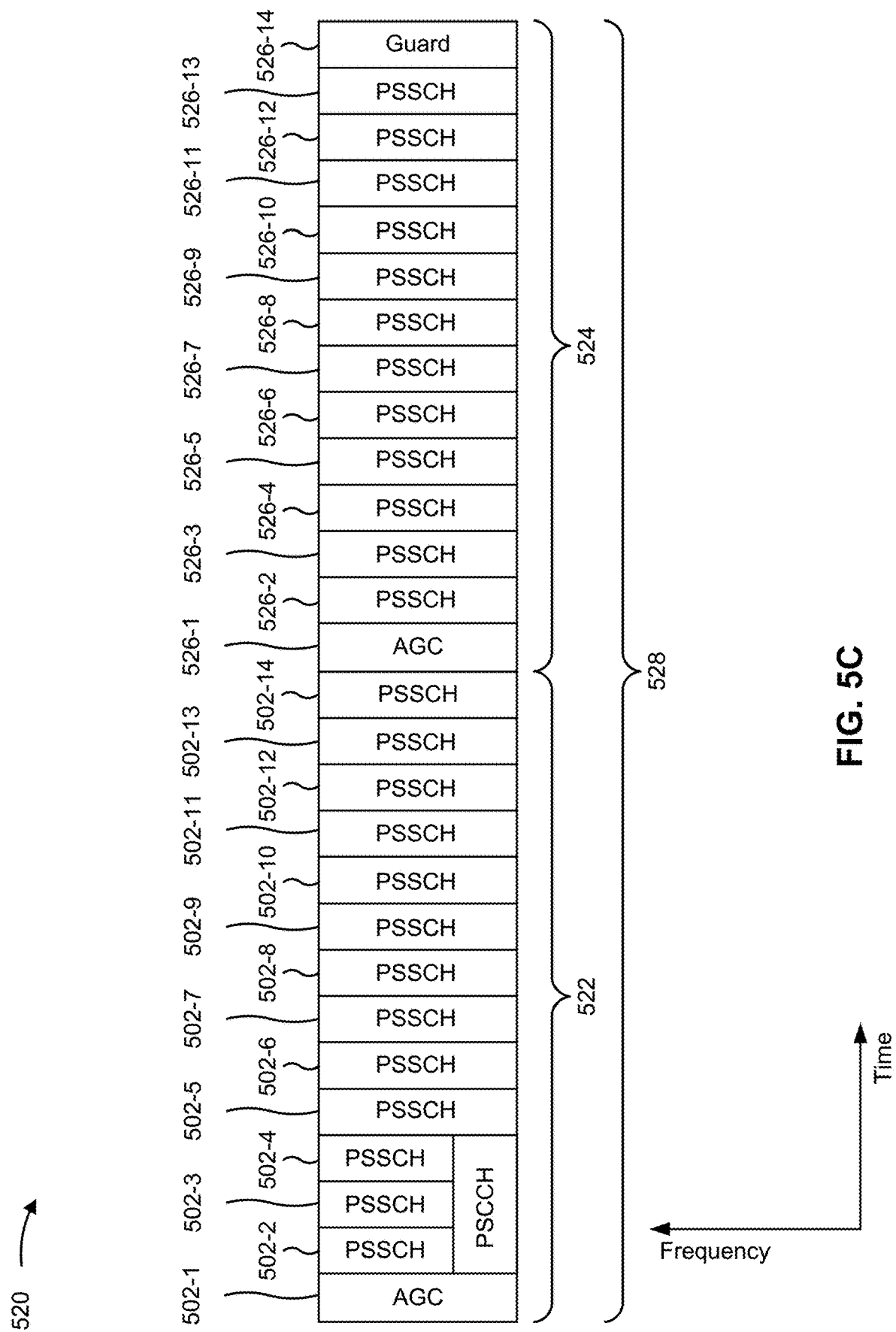

FIGS. 5A-5C are diagrams of example slot configurations, in accordance with the present disclosure. The example slot configurations include examples of slot configurations for sidelink slots that may be used in sidelink communication. However, other slot configurations are within the scope of the present disclosure.

FIG. 5A illustrates an example slot configuration 500 for a sidelink slot. The slot configuration 500 includes a plurality of time domain resources, including symbols 502-1 through 502-14 (e.g., sidelink symbols). While the slot configuration 500 includes 14 symbols in the example of FIG. 5A, other quantities of symbols are within the scope of the present disclosure. The symbols 502-1 through 502-14 may include OFDM symbols, time-domain symbols, and/or another type of symbols. The slot configuration 500 may also include one or more frequency domain resources, such as one or more sub-channels, one or more sub-carriers, one or more resource blocks, and/or one or more other types of frequency domain resources.

As further shown in FIG. 5A, one or more types of sidelink communications may be configured for transmission and/or reception in the sidelink slot. The one or more types of sidelink communications may include a reference signal (e.g., a DMRS and/or another type of reference signal), a shared channel communication (e.g., a physical sidelink shared channel (PSSCH) communication), a control channel communication (e.g., a physical sidelink control channel (PSCCH) communication), and/or another type of sidelink communication. PSCCH communication(s) in the sidelink slot may include SCI-1 as described above. The PSSCH communication(s) may include SCI-2 as described above and/or data (e.g., shared channel data).

In some aspects, the slot configuration 500 includes one or more guard symbols at the beginning of the sidelink slot, at the end of the sidelink slot, and/or in another location in the sidelink slot. The guard symbol(s) may be configured to reduce overlap (and thus, interference and/or collisions) of sidelink transmissions in adjacent sidelink slots.

In some aspects, the slot configuration 500 includes an automatic gain control (AGC) symbol at the beginning of the sidelink slot. The AGC symbol includes a copy or repetition of the first sidelink communication that is to be transmitted in the sidelink slot. For example, the AGC symbol in symbol 502-1 at the beginning of the sidelink slot may include a copy or repetition of the DMRS transmission in the symbol 502-2 and/or a copy or repetition of the PSCCH communication in the symbol 502-2. In this way, a UE 120 that is to receive the DMRS transmission may use the copy or repetition of the DMRS transmission and/or the copy or repetition of the PSCCH communication in the AGC symbol for automatic gain control. For example, the UE 120 may increase a receive gain, decrease a receive gain, and/or adjust another reception parameter based at least in part on the DMRS transmission and/or the PSCCH communication in the AGC symbol. This enables the UE 120 to increase the likelihood of reception of sidelink transmissions in the sidelink slot and to reduce the likelihood of dropped sidelink transmissions in the sidelink slot.

As further shown in FIG. 5A, in some cases, the slot configuration 500 includes frequency multiplexing of one or more types of sidelink communications in the sidelink slot. In the example shown in FIG. 5A, a PSCCH communication is frequency multiplexed with a DMRS transmission in the symbol 502-2, the PSCCH communication is frequency multiplexed with a PSSCH communication in the symbol 502-3, and the PSCCH communication is frequency multiplexed with a PSSCH communication in the symbol 502-4 (the same PSSCH communication as in the symbol 502-3 or a different PSSCH communication). However, other frequency multiplexing configurations are within the scope of the present disclosure.

FIG. 5B illustrates another example slot configuration 510 for a sidelink slot. As shown in FIG. 5B, the slot configuration 510 is similar to the slot configuration 500 except that the slot configuration 510 includes feedback resources for transmission and/or reception of feedback for sidelink communications transmitted on a sidelink. The feedback resources may include time domain resources, frequency domain resources, spatial domain resources, and/or another type of resources. In some aspects, the feedback resources are configured to enable transmission of the feedback for sidelink communications on a physical sidelink channel, such as a physical sidelink feedback channel (PSFCH) between UEs 120.

The feedback resources may be included in one or more symbols in the sidelink slot. For example, the feedback resources (e.g., the PSFCH resources) may be configured or scheduled in symbols 502-12 and 502-13 in the example slot configuration 510. However, other feedback resource configurations are within the scope of the present disclosure. In some aspects, feedback resources are configured with a periodicity, and may occur every slot, every 2 slots, every 4 slots, or according to another periodicity. Guard symbols (e.g., symbols 502-11 and 502-14 in the example in FIG. 5B) may be provided at the beginning and end of the feedback resources in the sidelink slot.

The feedback for a sidelink communication may include hybrid automatic repeat request (HARQ) feedback and/or another type of feedback for wireless communications. For example, feedback for a sidelink communication may include a HARQ acknowledgement (ACK) (which indicates that the sidelink communication was successfully received and decoded) or a HARQ negative ACK (NACK) (which indicates that the sidelink communication was not successfully decoded or was not received).

A UE 120 may configure a PSFCH communication to indicate an ACK or a NACK in a single resource block (RB) based at least in part on a cyclic shift. For example, a first cyclic shift for the PSFCH communication may indicate an ACK and a second cyclic shift for the PSFCH communication may indicate a NACK. As another example, the use of a cyclic shift for the PSFCH communication may indicate an ACK and the PSFCH communication without a cyclic shift may indicate a NACK. Other cyclic shift based feedback indications are within the scope of the present disclosure. In some cases, up to 6 cyclic shift pairs can be configured per RB to indicate feedback for sidelink communication. Thus, a PSFCH resource in a sidelink slot may be defined in code (cyclic shift), frequency (RB), or a combination thereof.

In some cases, a UE 120 may identify a feedback resource for transmitting feedback for a sidelink communication based at least in part on a mapping between the transmission of the sidelink communication and the feedback resource. For example, the UE 120 may determine that the sidelink communication was transmitted in slot i and sub-channel j, and may identify the RB(s) or physical RB(s) (PRB(s)) that are configured for slot i and sub-channel j. The UE 120 may transmit the feedback for the sidelink communication in the identified RB(s).

In some cases, feedback for sidelink communications may be transport block based. For example, one HARQ-ACK bit in a PSFCH communication may be provided for an entire transport block of the sidelink communication, where the one HARQ-ACK bit indicates an ACK or a NACK for the sidelink communication.

In some aspects, feedback for sidelink communications may be code block group (CBG) based. A CBG includes a plurality of successive code blocks in a transport block. Respective HARQ-ACK bits in a PSFCH communication may be provided for respective CBGs of a transport block of a sidelink communication, where each HARQ-ACK bit indicates an ACK or a NACK for an associated CBG. Accordingly, the quantity of HARQ-ACK bits corresponds to the quantity of CBGs included in the transport block. While CBG based feedback for sidelink communications increases the size of the PSFCH communication, retransmissions on the sidelink may be reduced (which reduces wireless resource usage, memory resource usage, and processing resource usage) as only failed CBGs (e.g., CBGs for which a NACK is reported) are retransmitted instead of the entire transport block.

Some aspects described herein enable a UE 120 to configure a PSFCH communication to indicate CBG based feedback for a sidelink communication without modifying the transmission sequences that are used for PSFCH transmission. In some aspects, a UE 120 receives a sidelink transmission that includes a transport block and transmits sidelink feedback, for each of a plurality of CBGs included in the transport block, in respective PSFCH resources. In this way, the UE 120 is enabled to provide CBG based feedback without having to increase the quantity of bits of (and thus, without modifying the sequences of) PSFCH communications that are transmitted to provide the CBG based feedback. This enables the size of the PSFCH communications to be maintained and avoids increasing complexity of receiving CBG based feedback. The techniques described herein enable the UE 120 to identify the PSFCH resources using a mapping that is based at least in part on an offset for the plurality of CBGs.

FIG. 5C illustrates another example slot configuration 520 for sidelink communication. In particular, the slot configuration 520 includes an example of slot aggregation for sidelink communication. As shown in FIG. 5C, the slot configuration 520 includes a plurality of slots (e.g., sidelink slots) 522 and 524 that are aggregated in that a single PSCCH communication is transmitted for scheduling a PSSCH communication that spans across the time domain resources and frequency domain resources of the slots 522 and 524. This reduces sidelink control channel overhead, enables more data to be transmitted per channel access on a sidelink, and/or enables increased resource utilization by eliminating guard symbols between slots, among other examples. Note that while the slot configuration 520 includes two aggregated slots, different quantities of aggregated slots are within the scope of the present disclosure.

As shown in FIG. 5C, the slot 522 includes symbols 502-1 through 502-14 and the slot 524 includes symbols 526-1 through 526-14. As described above, a single PSCCH communication is configured for the aggregated slots in the slot 522 (e.g., the first slot of the aggregated slots). The PSCCH communication may indicate a quantity of slots that are aggregated, such as 1 slot, 2 slots, 4 slots, 8 slots, or another quantity of slots. The aggregated slots (e.g., the slots 522 and 524) may be referred to as an aggregated slot 528.

Some aspects described herein enable a UE 120 to provide feedback (e.g., HARQ feedback, such as an ACK or a NACK) for a PSSCH communication that spans across the plurality of slots in the aggregated slot 528. In some aspects, feedback resource(s) are provided for the aggregated slot 528. The PSSCH communication may include a single transport block that spans across the plurality of slots or respective transport blocks in each of the plurality of slots in the aggregated slot 528. The feedback may be transport block based, CBG based, or a combination thereof. The UE 120 may provide the feedback for the PSSCH communication in a feedback resource that occurs after the aggregated slot 528, in a feedback resource that occurs during the aggregated slot 528, or a combination thereof. This reduces feedback resource usage, reduces the likelihood of feedback collisions across UEs, enables backward-compatibility for feedback for sidelink communication, and/or enables timely feedback for PSSCH communications that span a plurality of aggregated slots, among other examples.

As indicated above, FIGS. 5A-5C are provided as examples. Other examples may differ from what is described with respect to FIGS. 5A-5C.

Figure 6:
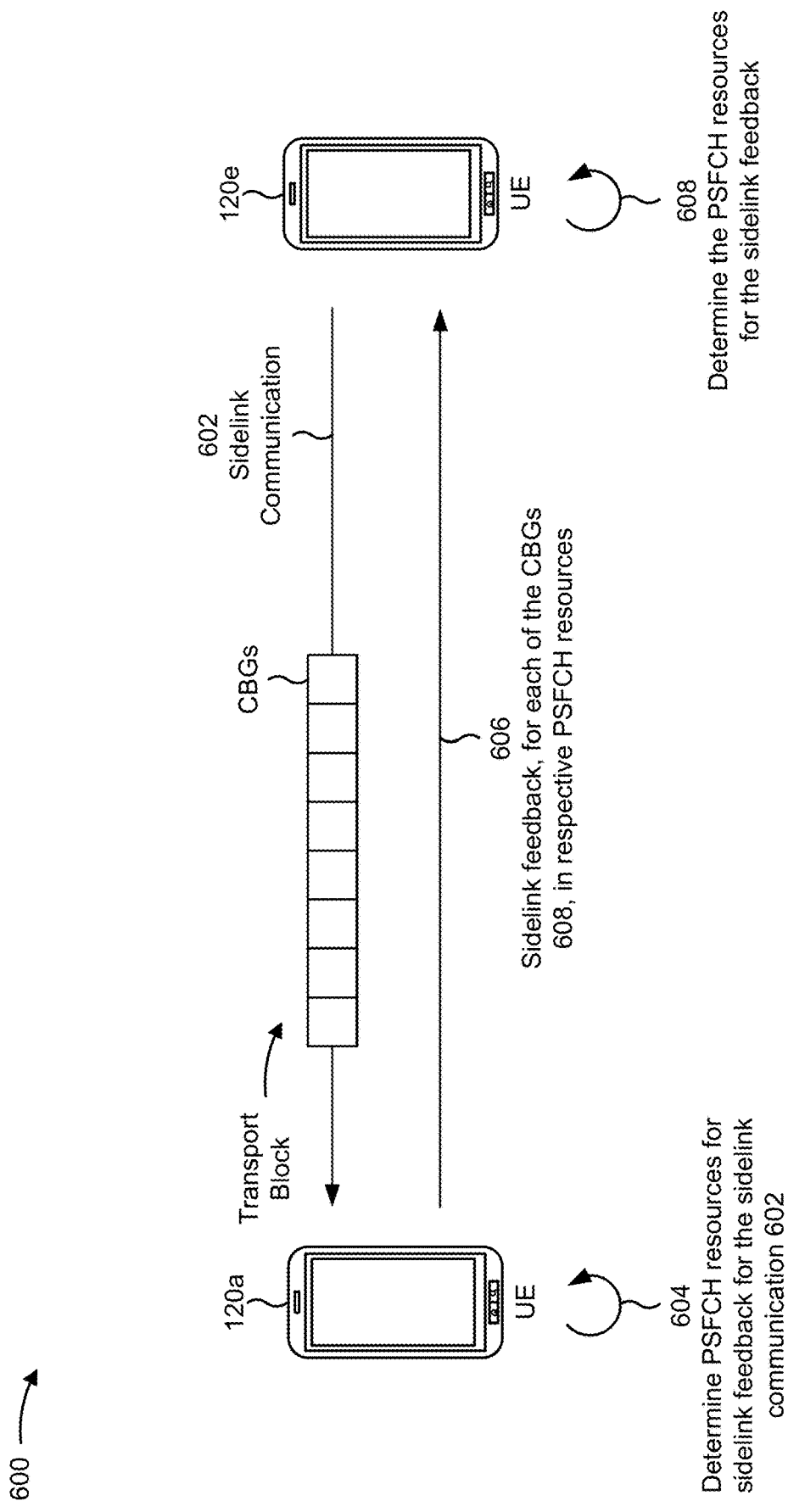
FIGS. 6-9 are diagrams illustrating examples of feedback for a sidelink transmission, in accordance with present disclosure.

FIG. 6 is a diagram illustrating an example 600 of feedback for a sidelink transmission, in accordance with present disclosure. As shown in FIG. 6, the example 600 includes communication between a plurality of UEs, including the UE 120a and the UE 120e. The UE 120a and the UE 120e may each include a UE 305-1, a UE 305-2, a Tx/Rx UE 405, an Rx/Tx UE 410, and/or another UE. In some aspects, the UE 120a and the UE 120e may be included in a wireless network such as the wireless network 100. The UE 120a and the UE 120e may communicate on a sidelink (e.g., a wireless sidelink directly between the UE 120a and the UE 120e).

As shown by reference number 602, the UE 120e may transmit a sidelink transmission to the UE 120a. The sidelink transmission may include a PSCCH communication, a PSSCH communication, and/or another type of sidelink communication. The sidelink transmission may include a transport block that includes a plurality of CBGs. The UE 120a may receive the sidelink transmission and may provide sidelink feedback for the sidelink transmission to the UE 120e. In particular, the UE 120a may provide CBG based sidelink feedback for the CBGs included in the transport block of the sidelink transmission.

In some aspects, the UE 120a determines to provide CBG based sidelink feedback for the CBGs based at least in part on CBG based feedback reporting being enabled or activated for the UE 120a. For example, the UE 120a may receive (e.g., from a base station 110, from the UE 120e, and/or from another wireless communication device) a configuration that enables or disables CBG based feedback reporting for the UE 120a.

In some aspects, the UE 120a determines to provide CBG based sidelink feedback for the CBGs based at least in part on a transmission priority associated with the sidelink transmission. For example, the UE 120a may determine to provide CBG based feedback for the CBGs based at least in part on determining that the transmission priority associated with the sidelink transmission satisfies a priority threshold. As another example, the UE 120a may determine to provide transport block based feedback instead of CBG based feedback for the sidelink transmission based at least in part on determining that the transmission priority associated with the sidelink transmission does not satisfy a priority threshold.

In some aspects, the UE 120a determines to provide CBG based sidelink feedback for the CBGs based at least in part on a transmission type associated with the sidelink transmission. For example, the UE 120a may determine to provide CBG based feedback for the CBGs based at least in part on the sidelink transmission being a unicast transmission. As another example, the UE 120a may determine to provide transport block based feedback instead of CBG based feedback for the sidelink transmission based at least in part on the sidelink transmission being a multicast transmission. As another example, the UE 120a may determine to provide CBG based feedback for the CBGs based at least in part on the sidelink transmission being a groupcast sidelink transmission (e.g., for connection-based groupcast such as groupcast option 2), where the PSFCH resources for the CBG based feedback are divided among group members to which the groupcast sidelink transmission is directed.

In some aspects, the UE 120a determines to provide CBG based sidelink feedback for the CBGs based at least in part on a combination of the above-described parameters and/or based at least in part on one or more other parameters.

As shown by reference number 604, the UE 120a may determine PSFCH resources for the sidelink feedback. The sidelink transmission may be mapped to a plurality of PSFCH resources, and the UE 120a may determine respective PSFCH resources (of the plurality of PSFCH resources) for each of the CBGs included in the transport block of the sidelink transmission. The PSFCH resources may include code-frequency resources (e.g., PSFCH resources that each include a code resource such as a cyclic shift and a frequency resource such as an RB), frequency-only resources (e.g., PSFCH resources that include only a frequency resources such as an RB), or a combination thereof. A PSFCH resource for a CBG of the plurality of CBGs may include a PRB that includes one pair of cyclic shifts, where a first cyclic shift of the pair is configured for indicating an ACK for the CBG and a second cyclic shift of the pair is configured for indicating a NACK for the CBG.

The UE 120a may determine the PSFCH resources based at least in part on a mapping of the CBGs to the PSFCH resources. The UE 120a may determine the mapping based at least in part on a plurality of parameters associated with the sidelink transmission and/or the UE 120a, among other examples. For example, the UE 120a may determine an index of a PSFCH resource for a CBG of the sidelink transmission based at least in part on:

$$(P_{ID} M_{ID}) \bmod R_{PRB,CS}^{PSFCH}$$

where $P_{ID}$ corresponds to a physical layer source identifier associated with the sidelink transmission and $M_{ID}$ is a field for indicating an identifier associated with the UE 120a, where $M_{ID}$ is repurposed to indicate an offset value associated with the CBG.

As another example, the UE 120a may determine an index of a PSFCH resource for a CBG of the sidelink transmission based at least in part on:

$$(P_{ID}+M_{ID}+X) \bmod R_{PRB,CS}^{PSFCH}$$

where $P_{ID}$ corresponds to a physical layer source identifier associated with the sidelink transmission, $M_{ID}$ corresponds to an identifier associated with the UE 120a, and X corresponds to the offset value associated with the CBG.

The offset value may correspond to a CBG index of the CBG. Thus, using CBG indexes of the CBGs of the sidelink transmission results in a staggered PSFCH resource mapping for the CBGs, where each CBG is mapped to a different PSFCH resource (e.g., to a different PRB).

As shown by reference number 606, the UE 120a may transmit the sidelink feedback to the UE 120e. In particular, the UE 120a may transmit (and the UE 120e may receive) CBG based sidelink feedback, for each of the plurality of CBGs included in the transport block of the sidelink transmission, in the respective PSFCH resources determined by the UE 120a.

In some aspects, the UE 120a transmits (and the UE 120e receives) transport block level sidelink feedback for the transport block in addition to the CBG based sidelink feedback. In these aspects, the UE 120a may transmit the transport block level sidelink feedback in a separate PSFCH resource from the PSFCH resources in which the CBG based sidelink is transmitted. In some aspects, the UE 120a transmits the transport block level sidelink feedback in a first PSFCH resource, and transmits the CBG based sidelink feedback in subsequent PSFCH resources. In some aspects, the UE 120a transmits the transport block level sidelink feedback in a PSFCH resource that occurs after the PSFCH resources in which the CBG based sidelink feedback is transmitted.

As shown by reference number 608, the UE 120e may determine the PSFCH resources for the CBGs included in the transport block of the sidelink transmission. In particular, the UE 120e may determine the frequency locations of the CBG based sidelink feedback for the sidelink transmission using similar techniques as described above for the UE 120a at reference number 604.

The UE 120e may determine whether an ACK or a NACK was received for the CBGs of the sidelink transmission. If a NACK was received for a CBG, the UE 120e may perform a retransmission of the CBG, which enables the UE 120a to receive the CBG.

As indicated above, FIG. 6 is provided as an example. Other examples may differ from what is described with respect to FIG. 6.

Figure 7:
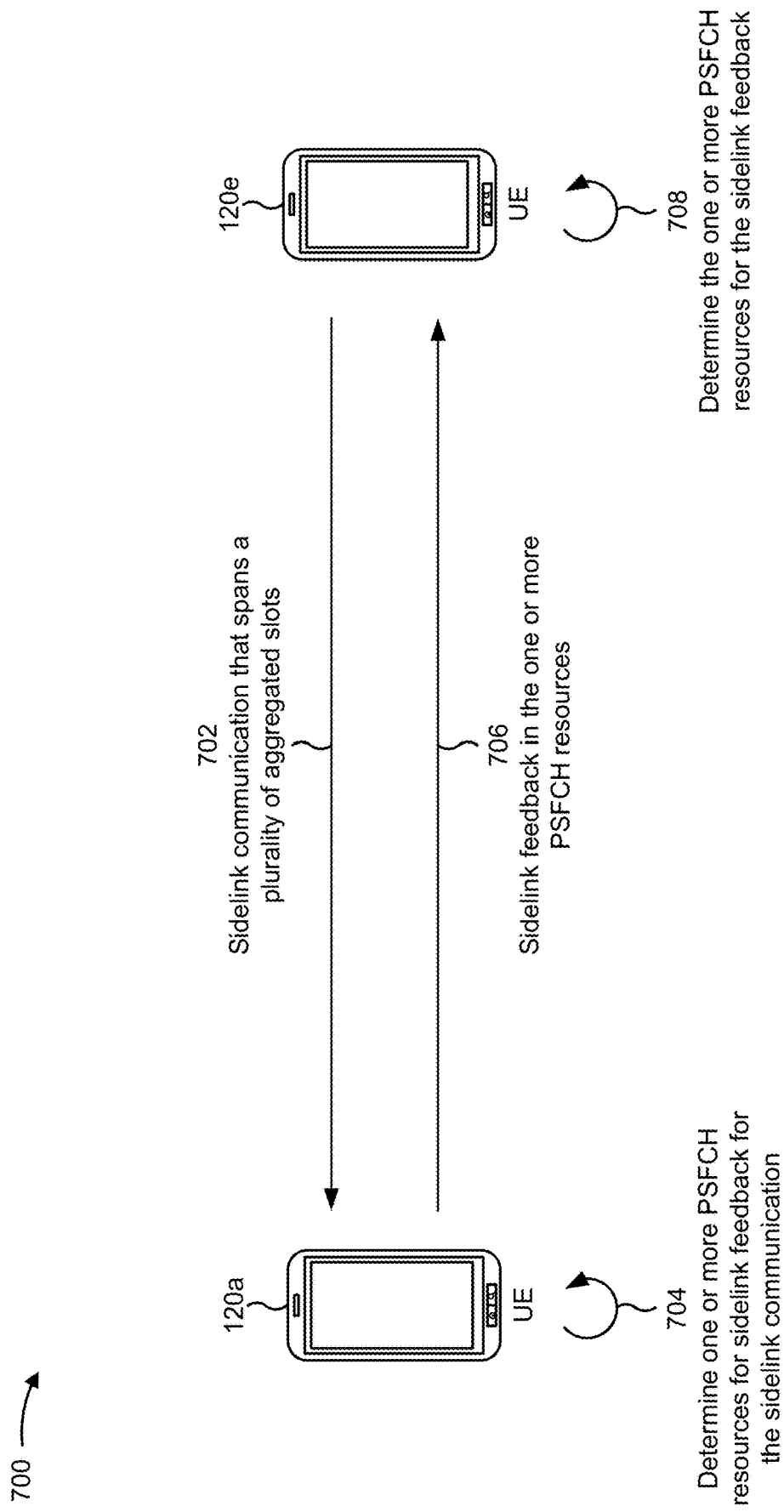

FIG. 7 is a diagram illustrating an example 700 of feedback for a sidelink transmission, in accordance with present disclosure. As shown in FIG. 7, the example 700 includes communication between a plurality of UEs, including the UE 120a and the UE 120e. The UE 120a and the UE 120e may each include a UE 305-1, a UE 305-2, a Tx/Rx UE 405, an Rx/Tx UE 410, and/or another UE. In some aspects, the UE 120a and the UE 120e may be included in a wireless network such as the wireless network 100. The UE 120a and the UE 120e may communicate on a sidelink (e.g., a wireless sidelink directly between the UE 120a and the UE 120e).

As shown by reference number 702, the UE 120e may transmit a sidelink transmission to the UE 120a. The UE 120e may transmit the sidelink transmission in an aggregated slot that includes a plurality of sidelink slots. Accordingly, the sidelink transmission may include a PSCCH communication, a PSSCH communication, and/or another type of sidelink communication that spans the plurality of slots of the aggregated slot. The sidelink transmission may include a transport block, a plurality of transport blocks, a plurality of CBGs, or a combination thereof. The UE 120a may receive the sidelink transmission and may provide sidelink feedback for the sidelink transmission to the UE 120e.

As shown by reference number 704, the UE 120a may determine one or more PSFCH resources for the sidelink feedback. The one or more PSFCH resources may include one or more PSFCH resources that occur during the sidelink transmission (e.g., that occur in the aggregated slot), may include a PSFCH resource that occurs after the sidelink transmission (e.g., that occurs in a slot that is after the aggregated slot), or a combination thereof.

As shown by reference number 706, the UE 120a may transmit the sidelink feedback to the UE 120e. In particular, the UE 120a may transmit (and the UE 120e may receive) the sidelink feedback in the one or more PSFCH resources determined by the UE 120a. In some aspects, the sidelink feedback may include a single ACK or a single NACK for the entire sidelink transmission. In some aspects, the sidelink feedback may include a respective ACK or a respective NACK for each slot in which the sidelink transmission was transmitted.

In some aspects, the UE 120a transmits the sidelink feedback based at least in part on a feedback configuration (e.g., received from a base station 110, received from the UE 120e, hardcoded at the UE 120a). In some aspects, the feedback configuration (or one or more feedback parameters) is indicated in a header of the sidelink transmission. The feedback configuration may indicate a quantity of sidelink feedbacks that are to be provided for the sidelink transmission, a quantity of transport blocks and/or a quantity of code blocks of the sidelink transmission that is for each sidelink feedback (e.g., a feedback granularity), and/or another feedback parameter.

As shown by reference number 708, the UE 120e may determine the PSFCH resource(s) for the sidelink feedback. In particular, the UE 120e may determine the PSFCH resource(s) using similar techniques as described above for the UE 120a at reference number 704.

The UE 120e may determine whether an ACK or a NACK was received for the sidelink transmission (or for the slots in which the sidelink transmission was transmitted). If a NACK was received for a CBG, the UE 120e may perform a retransmission of the sidelink transmission (or may perform a retransmission of the information transmitted for which a NACK was received).

As indicated above, FIG. 7 is provided as an example. Other examples may differ from what is described with respect to FIG. 7.

Figure 8:
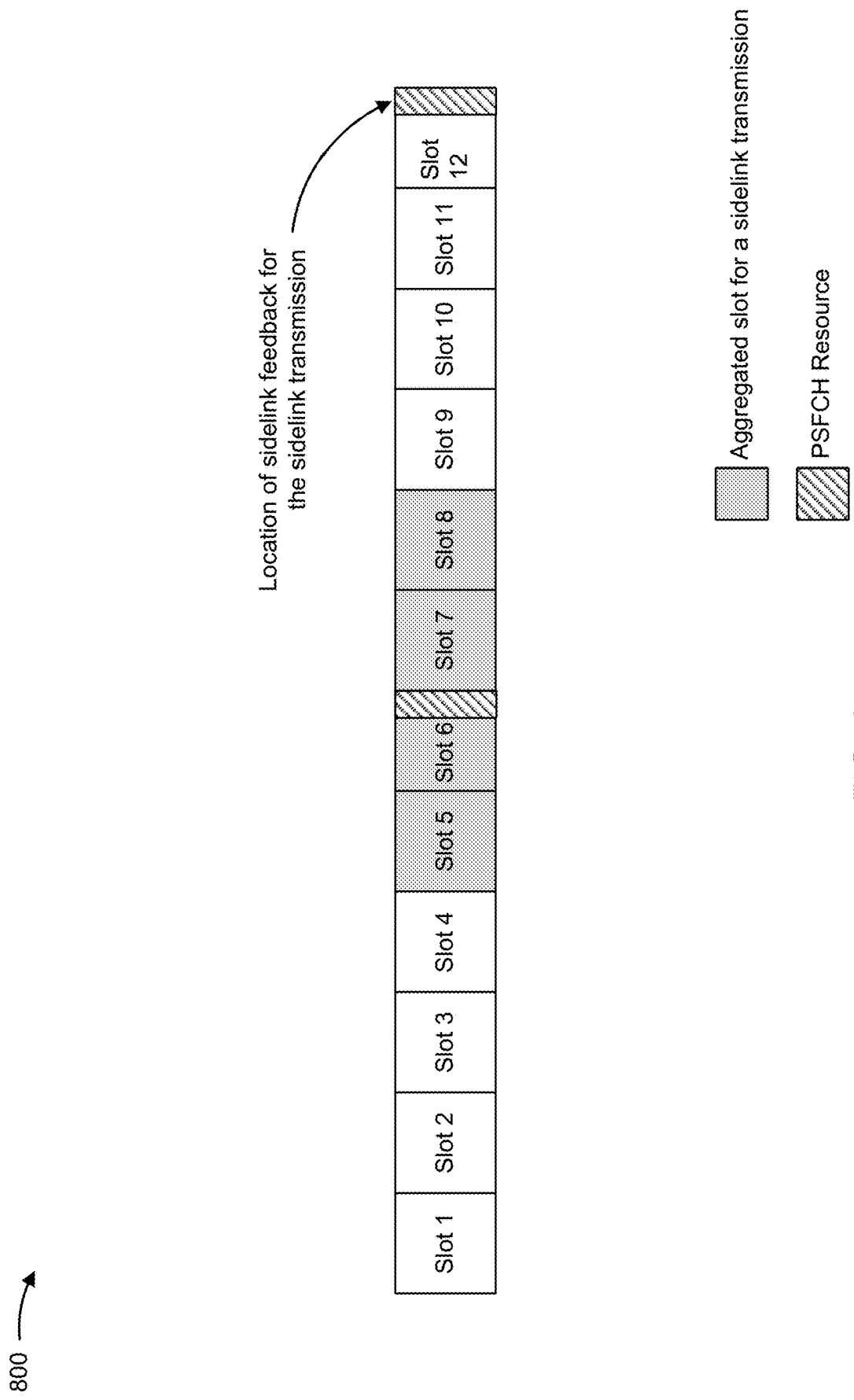

FIG. 8 is a diagram illustrating an example 800 of feedback for a sidelink transmission, in accordance with present disclosure. In particular, the example 800 includes an example of providing sidelink feedback in a single PSFCH resource for a sidelink transmission that spans a plurality of slots of an aggregated slot.

As shown in FIG. 8, an aggregated slot may span a plurality of slots (e.g., Slots 5-8 of Slots 1-12). The UE 120a may transmit sidelink feedback, for a sidelink transmission that was transmitted in the aggregated slot, in a single PSFCH resource that occurs after the sidelink transmission (e.g., that occurs after the last slot of the aggregated slot).

In some aspects, the UE 120a (and, in some cases, the UE 120e) determines the first PSFCH resource that occurs after the sidelink transmission and transmits a single sidelink feedback for the entire sidelink transmission in the first PSFCH resource that occurs after the sidelink transmission. In other words, after the end of the period sl-PSFCH-Period (e.g., as defined in Section 16.3 of 3GPP TS 38.213), the UE 120*a* transmits the sidelink feedback, for the sidelink transmission having an ending slot in the period sl-PSFCH-Period, in the first PSFCH resource that occurs after the sidelink transmission. The UE 120*a* (and, in some cases, the UE 120*e*) determines the first PSFCH resource that occurs after the sidelink transmission based on an index i of the ending slot of the aggregated slot, and the sub-channel j in which the sidelink transmission was transmitted. The UE 120*a* allocates the $[(i+j \cdot N_{PSSCH}^{PSFCH}) \cdot M_{subch,\ slot}^{PSFCH}$, $(i+1+j \cdot N_{PSSCH}^{PSFCH}) \cdot M_{subch,\ slot}^{PSFCH} - 1]$ PRBs in the PSFCH resource for transmitting the sidelink feedback for the sidelink transmission.

In some aspects, the UE 120*a* (and, in some cases, the UE 120*e*) determines the first PSFCH resource that occurs after the sidelink transmission and transmits, in the first PSFCH resource that occurs after the sidelink transmission, respective sidelink feedbacks for each slot in which the sidelink transmission was transmitted. In some aspects, the UE 120*a* (and, in some cases, the UE 120*e*) determines the first PSFCH resource that occurs at least a threshold quantity of slots after the last slot of the plurality of slots of the aggregated slot, and transmits the sidelink feedback in the first PSFCH resource that occurs at least a threshold quantity of slots after the last slot of the plurality of slots of the aggregated slot. The threshold quantity of slots may be indicated by a minimum time gap parameter (e.g., an sl-MinTimGapPSFCH parameter) or another parameter. The threshold quantity of slots provides a sufficient time gap, between reception of the sidelink transmission and transmission of the sidelink feedback, to generate the feedback for the sidelink transmission.

In some aspects, the UE 120*a* (and, in some cases, the UE 120*e*) determines an index of the PSFCH resource for the sidelink feedback based at least in part on:

$$(P_{ID} + M_{ID} + T_{ID}) \bmod R$$

where $T_{ID}$ is the index of a transport block or a code block in the sidelink transmission (starting from number 0), $P_{ID}$ is a physical layer source identifier associated with the sidelink transmission, and $M_{ID}$ is an identifier associated with the UE 120*a*.

As indicated above, FIG. 8 is provided as an example. Other examples may differ from what is described with respect to FIG. 8.

Figure 9:
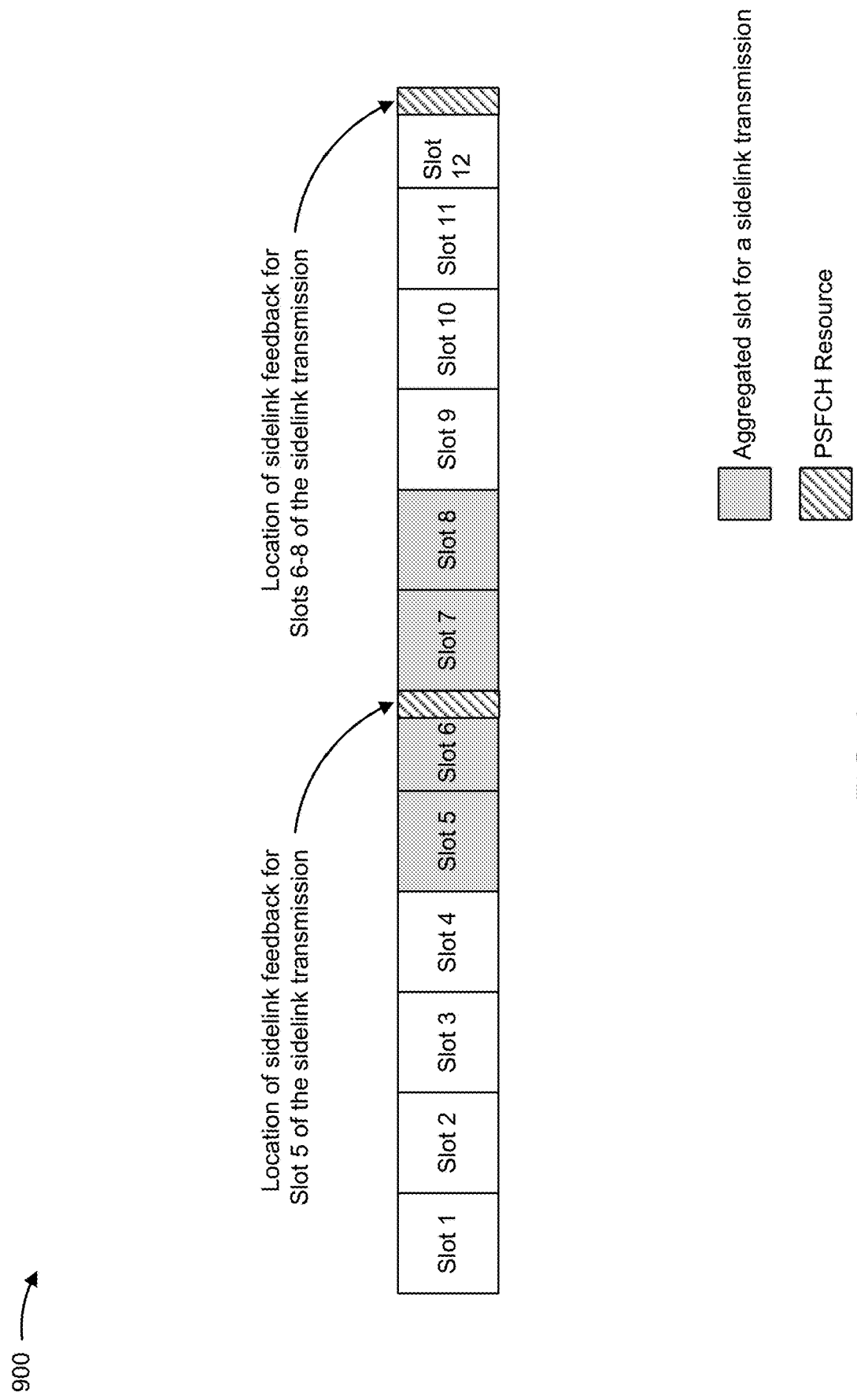

FIG. 9 is a diagram illustrating an example 900 of feedback for a sidelink transmission, in accordance with present disclosure. In particular, the example 900 includes an example of providing sidelink feedback in a plurality of PSFCH resources for a sidelink transmission that spans a plurality of slots of an aggregated slot.

As shown in FIG. 9, an aggregated slot may span a plurality of slots (e.g., Slots 5-8 of Slots 1-12). The UE 120*a* may transmit sidelink feedback, for a sidelink transmission that was transmitted in the aggregated slot, in a plurality of PSFCH resources, where one or more first PSFCH resources occur during the sidelink transmission (e.g., occur in the aggregated slot) and one or more second PSFCH resources occur after the sidelink transmission (e.g., occurs after the last slot of the aggregated slot).

The UE 120*a* may determine to transmit a plurality of sidelink feedbacks, where each sidelink feedback is transmitted for a respective slot of the aggregated slot in which the sidelink transmission is transmitted. For example, the UE 120*a* may transmit a sidelink feedback (e.g., an ACK or a NACK) for the sidelink transmission (e.g., the transport blocks and/or the code blocks) transmitted in Slot 5, may transmit another sidelink feedback (e.g., an ACK or a NACK) for the sidelink transmission (e.g., the transport blocks and/or the code blocks) transmitted in Slot 6, may transmit another sidelink feedback (e.g., an ACK or a NACK) for the sidelink transmission (e.g., the transport blocks and/or the code blocks) transmitted in Slot 7, and may transmit another sidelink feedback (e.g., an ACK or a NACK) for the sidelink transmission (e.g., the transport blocks and/or the code blocks) transmitted in Slot 8.

The UE 120*a* may transmit sidelink feedback, for each slot in which the sidelink transmission is transmitted, in the first PSFCH resource that occurs after each slot (or in the first PSFCH resource that occurs after a threshold quantity of slots after each slot). For example, the UE 120*a* may transmit sidelink feedback, for Slot 5 of the sidelink transmission, in the PSFCH resource included in Slot 6 because the PSFCH resource included in Slot 6 is the first PSFCH resource that occurs after Slot 5. As another example, the UE 120*a* may transmit respective sidelink feedbacks, for each of Slots 6-8 of the sidelink transmission, in the PSFCH resource included in Slot 12 because the PSFCH resource included in Slot 12 is the first PSFCH resource that occurs after each of Slots 6-8.

Generally, the UE 120*a* may transmit sidelink feedback in the PSFCH resource included in Slot 12 (e.g., the PSFCH resource that occurs after the sidelink transmission) for slots of the sidelink transmission that occur prior to the slot in which the first PSFCH resources occur, for slots of the sidelink transmission that occur during the slot in which the first PSFCH resources occur, and/or for slots of the sidelink transmission that occur after the slot in which the first PSFCH resources occur. In some aspects, the UE 120*a* transmits sidelink feedback, for a slot of the sidelink transmission, in the first PSFCH that occurs after a threshold quantity of slots of the slot of the sidelink transmission, to provide sufficient processing time for the UE 120*a* to process the sidelink transmission and generate the sidelink feedback.

As indicated above, FIG. 9 is provided as an example. Other examples may differ from what is described with respect to FIG. 9.

Figure 10:
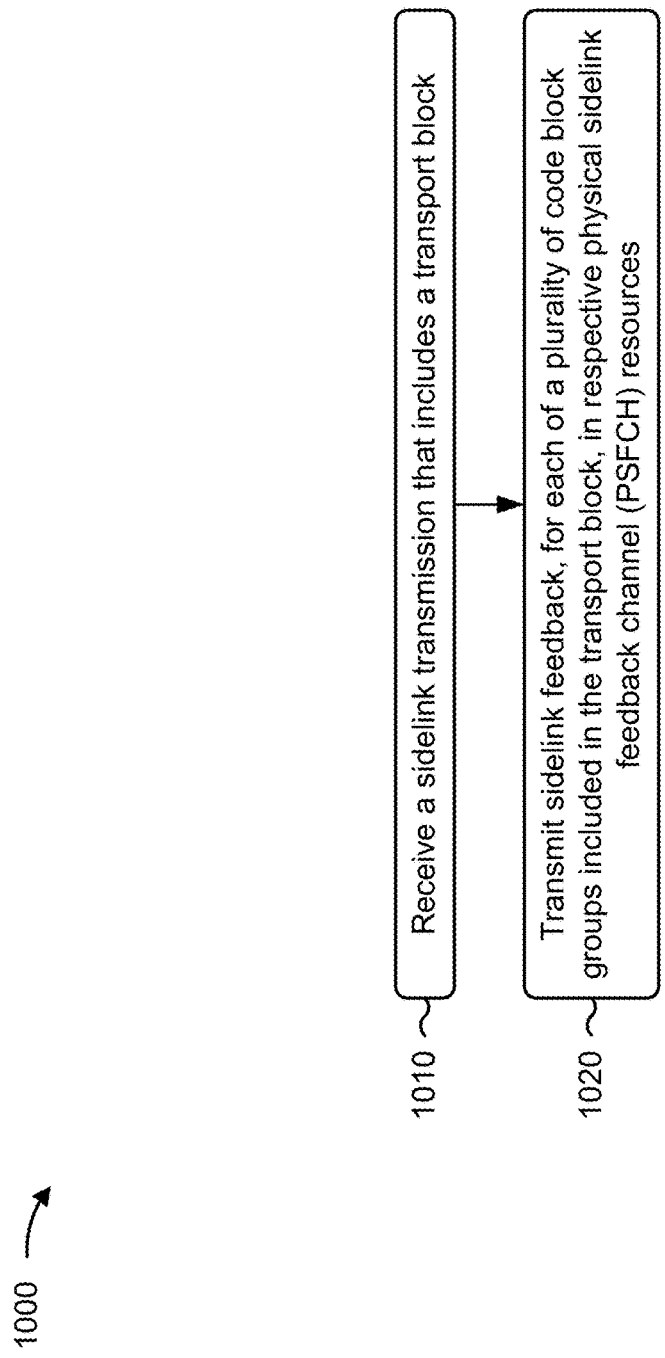
FIGS. 10-13 are diagrams illustrating example processes associated with feedback for a sidelink transmission, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with feedback for sidelink transmissions.

As shown in FIG. 10, in some aspects, process 1000 may include receiving a sidelink transmission that includes a transport block (block 1010). For example, the UE (e.g., using communication manager 140 and/or reception component 1402, depicted in FIG. 14) may receive a sidelink transmission that includes a transport block, as described above.

As further shown in FIG. 10, in some aspects, process 1000 may include transmitting sidelink feedback, for each of a plurality of code block groups included in the transport block, in respective PSFCH resources (block 1020). For example, the UE (e.g., using communication manager 140 and/or transmission component 1404, depicted in FIG. 14) may transmit sidelink feedback, for each of a plurality of code block groups included in the transport block, in respective PSFCH resources, as described above.

Process 1000 may include additional aspects, such as any single aspect or any combination of aspects described below and/or in connection with one or more other processes described elsewhere herein.

In a first aspect, with respect to process 1000, the respective PSFCH resources comprise respective code-frequency resources.

In a second aspect, alone or in combination with the first aspect, and with respect to process 1000, the respective PSFCH resources comprise respective frequency-only resources.

In a third aspect, alone or in combination with one or more of the first and second aspects, and with respect to process 1000, a PSFCH resource, of the respective PSFCH resources, comprises a physical resource block that includes a pair of cyclic shifts, wherein a first cyclic shift of the pair of cyclic shifts is configured for indicating an acknowledgement of an associated code block group of the plurality of code block groups, and wherein a second cyclic shift of the pair of cyclic shifts is configured for indicating a negative acknowledgement of the associated code block group.

In a fourth aspect, alone or in combination with one or more of the first through third aspects, and with respect to process 1000, transmitting the sidelink feedback for each of the plurality of code block groups comprises transmitting the sidelink feedback for each of the plurality of code block groups based at least in part on at least one of a configuration, a transmission priority associated with the sidelink transmission, or a transmission type associated with the sidelink transmission.

In a fifth aspect, alone or in combination with one or more of the first through fourth aspects, and with respect to process 1000, process 1000 includes determining an index of a PSFCH resource, of the respective PSFCH resources, for a code block group of the plurality of code block groups based at least in part on a physical layer source identifier associated with the sidelink transmission, and an offset value associated with the code block group.

In a sixth aspect, alone or in combination with one or more of the first through fifth aspects, and with respect to process 1000, determining the index of the PSFCH resource comprises determining the index of the PSFCH resource based at least in part on an identifier associated with the UE.

In a seventh aspect, alone or in combination with one or more of the first through sixth aspects, and with respect to process 1000, process 1000 includes transmitting transport-block-level sidelink feedback for the transport block in another PSFCH resource.

In an eighth aspect, alone or in combination with one or more of the first through seventh aspects, and with respect to process 1000, the sidelink transmission comprises a groupcast sidelink transmission, and the respective PSFCH resources are included in a plurality of PSFCH resources for group members associated with the groupcast sidelink transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
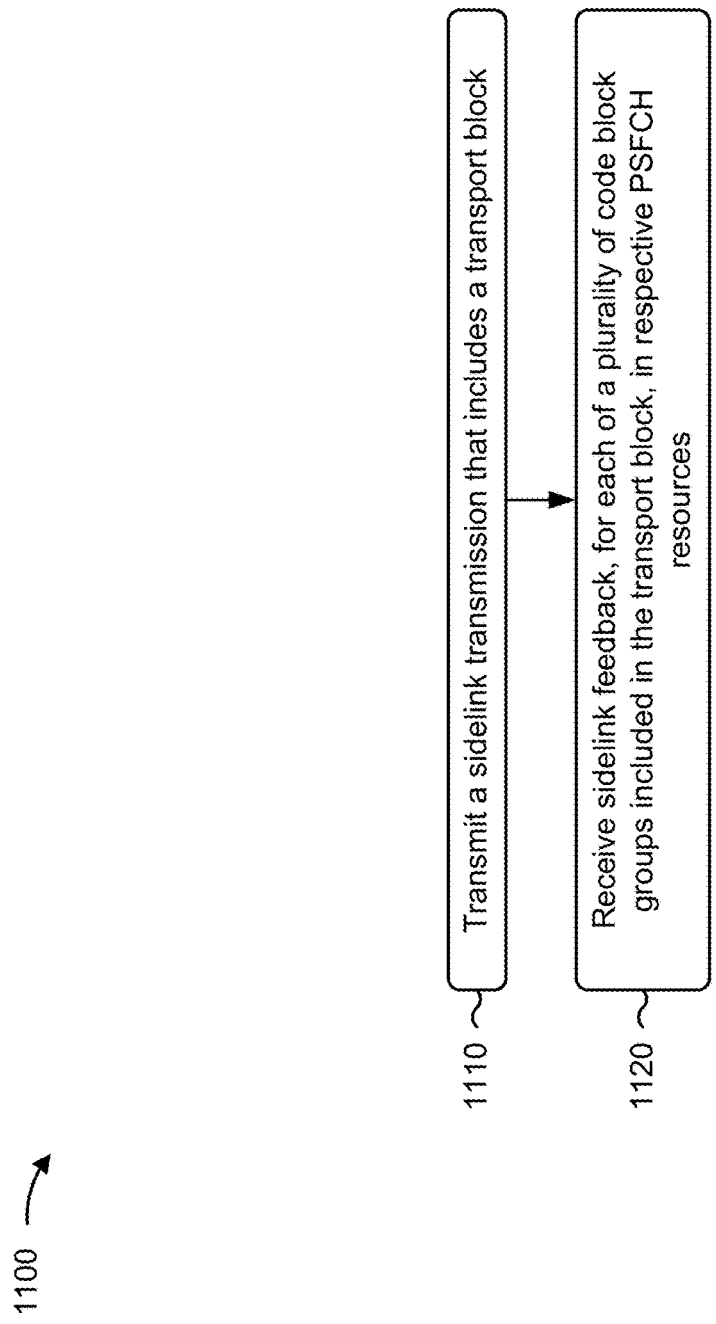

FIG. 11 is a diagram illustrating an example process 1100 performed, for example, by a UE, in accordance with the present disclosure. Example process 1100 is an example where the UE (e.g., UE 120) performs operations associated with feedback for sidelink transmissions.

As shown in FIG. 11, in some aspects, process 1100 may include transmitting a sidelink transmission that includes a transport block (block 1110). For example, the UE (e.g., using communication manager 140 and/or transmission component 1504, depicted in FIG. 15) may transmit a sidelink transmission that includes a transport block, as described above.

As further shown in FIG. 11, in some aspects, process 1100 may include receiving sidelink feedback, for each of a plurality of code block groups included in the transport block, in respective PSFCH resources (block 1120). For example, the UE (e.g., using communication manager 140 and/or reception component 1502, depicted in FIG. 15) may receive sidelink feedback, for each of a plurality of code block groups included in the transport block, in respective PSFCH resources, as described above.

Process 1100 may include additional aspects, such as any single aspect or any combination of aspects described below and/or in connection with one or more other processes described elsewhere herein.

In a first aspect, and with respect to process 1100, the respective PSFCH resources comprise respective code-frequency resources.

In a second aspect, alone or in combination with the first aspect, and with respect to process 1100, the respective PSFCH resources comprise respective frequency-only resources.

In a third aspect, alone or in combination with one or more of the first and second aspects, and with respect to process 1100, a PSFCH resource, of the respective PSFCH resources, comprises a physical resource block that includes a pair of cyclic shifts, wherein a first cyclic shift of the pair of cyclic shifts is configured for indicating an acknowledgement of an associated code block group of the plurality of code block groups, and wherein a second cyclic shift of the pair of cyclic shifts is configured for indicating a negative acknowledgement of the associated code block group.

In a fourth aspect, alone or in combination with one or more of the first through third aspects, and with respect to process 1100, receiving the sidelink feedback for each of the plurality of code block groups comprises receiving the sidelink feedback for each of the plurality of code block groups based at least in part on at least one of a configuration, a transmission priority associated with the sidelink transmission, or a transmission type associated with the sidelink transmission.

In a fifth aspect, alone or in combination with one or more of the first through fourth aspects, and with respect to process 1100, process 1100 includes determining an index of a PSFCH resource, of the respective PSFCH resources, for a code block group of the plurality of code block groups based at least in part on a physical layer source identifier associated with the sidelink transmission, and an offset value associated with the code block group.

In a sixth aspect, alone or in combination with one or more of the first through fifth aspects, and with respect to process 1100, determining the index of the PSFCH resource comprises determining the index of the PSFCH resource based at least in part on an identifier associated with another UE that transmitted the sidelink feedback.

In a seventh aspect, alone or in combination with one or more of the first through sixth aspects, and with respect to process 1100, process 1100 includes receiving transport-block-level sidelink feedback for the transport block in another PSFCH resource.

In an eighth aspect, alone or in combination with one or more of the first through seventh aspects, and with respect to process 1100, the sidelink transmission comprises a groupcast sidelink transmission, and the respective PSFCH resources are included in a plurality of PSFCH resources for group members associated with the groupcast sidelink transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
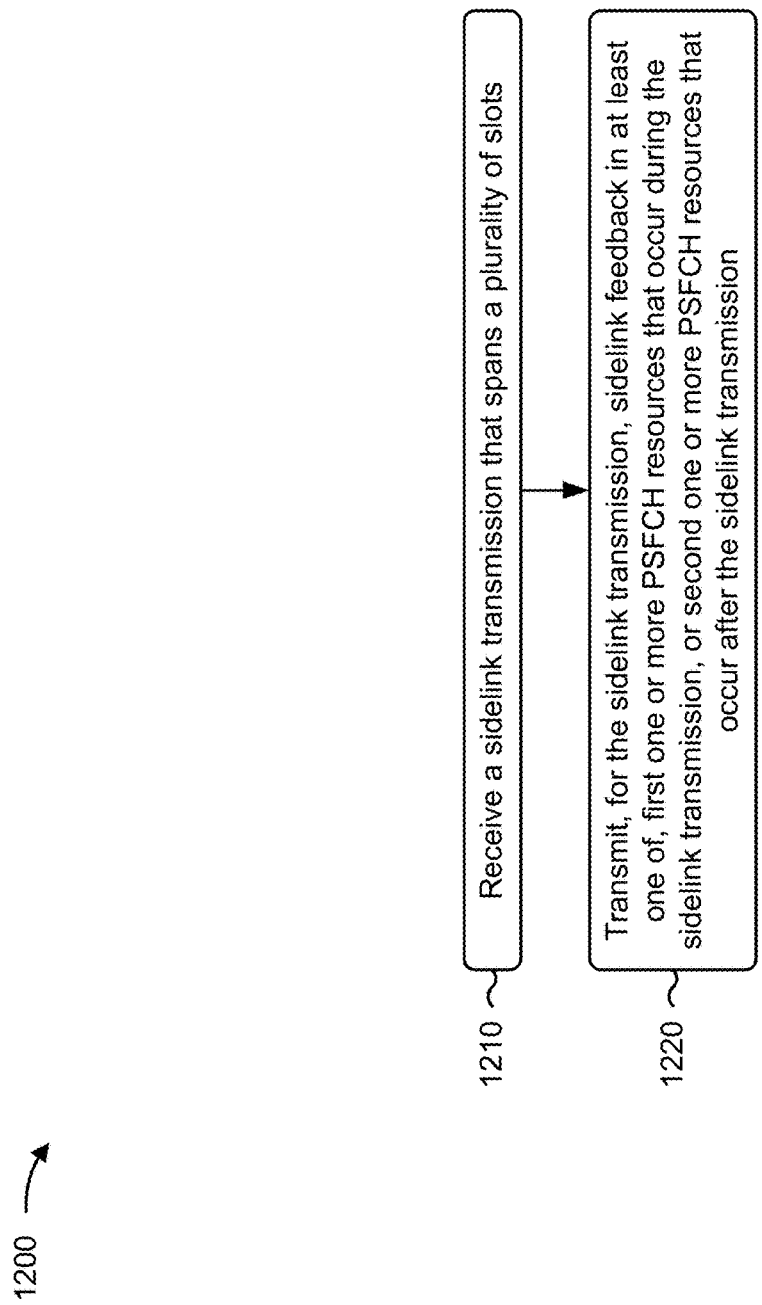

FIG. 12 is a diagram illustrating an example process 1200 performed, for example, by a UE, in accordance with the present disclosure. Example process 1200 is an example where the UE (e.g., UE 120) performs operations associated with feedback for sidelink transmissions.

As shown in FIG. 12, in some aspects, process 1200 may include receiving a sidelink transmission that spans a plurality of slots (block 1210). For example, the UE (e.g., using communication manager 140 and/or reception component 1602, depicted in FIG. 16) may receive a sidelink transmission that spans a plurality of slots, as described above.

As further shown in FIG. 12, in some aspects, process 1200 may include transmitting, for the sidelink transmission, sidelink feedback in at least one of: first one or more PSFCH resources that occur during the sidelink transmission, or second one or more PSFCH resources that occur after the sidelink transmission (block 1220). For example, the UE (e.g., using communication manager 140 and/or transmission component 1604, depicted in FIG. 16) may transmit, for the sidelink transmission, sidelink feedback in at least one of: first one or more PSFCH resources that occur during the sidelink transmission, or second one or more PSFCH resources that occur after the sidelink transmission, as described above.

Process 1200 may include additional aspects, such as any single aspect or any combination of aspects described below and/or in connection with one or more other processes described elsewhere herein.

In a first aspect, and with respect to process 1200, transmitting the sidelink feedback comprises transmitting a single sidelink feedback for the sidelink transmission in a PSFCH resource of the second one or more PSFCH resources that occur after the sidelink transmission, wherein the PSFCH resource occurs after a last slot of the plurality of slots.

In a second aspect, alone or in combination with the first aspect, and with respect to process 1200, the PSFCH resource occurs at least a threshold quantity of slots after the last slot of the plurality of slots.

In a third aspect, alone or in combination with one or more of the first and second aspects, and with respect to process 1200, transmitting the sidelink feedback comprises transmitting respective sidelink feedbacks for each slot of the plurality of slots in which the sidelink transmission was transmitted.

In a fourth aspect, alone or in combination with one or more of the first through third aspects, and with respect to process 1200, transmitting the respective sidelink feedbacks comprises transmitting the respective sidelink feedbacks in the second one or more PSFCH resources that occur after the sidelink transmission.

In a fifth aspect, alone or in combination with one or more of the first through fourth aspects, and with respect to process 1200, transmitting the respective sidelink feedbacks comprises transmitting a first subset of the respective sidelink feedbacks in the first one or more PSFCH resources that occur during the sidelink transmission, wherein the first subset of the respective sidelink feedbacks is associated with a first subset of the plurality of slots that occur prior to a slot in which the first one or more PSFCH resources are located, and transmitting a second subset of the respective sidelink feedbacks in the second one or more PSFCH resources that occur after the sidelink transmission, wherein the second subset of the respective sidelink feedbacks is associated with a second subset of the plurality of slots that occur at least one of: prior to the slot in which the first one or more PSFCH resources are located, during the slot in which the first one or more PSFCH resources are located, or after the slot in which the first one or more PSFCH resources are located.

In a sixth aspect, alone or in combination with one or more of the first through fifth aspects, and with respect to process 1200, transmitting the sidelink feedback comprises transmitting the sidelink feedback based at least in part on a feedback configuration indicated in a header of the sidelink transmission, wherein the feedback configuration indicates at least one of a quantity of sidelink feedbacks that are to be provided for the sidelink transmission, or a feedback granularity for the sidelink feedback.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
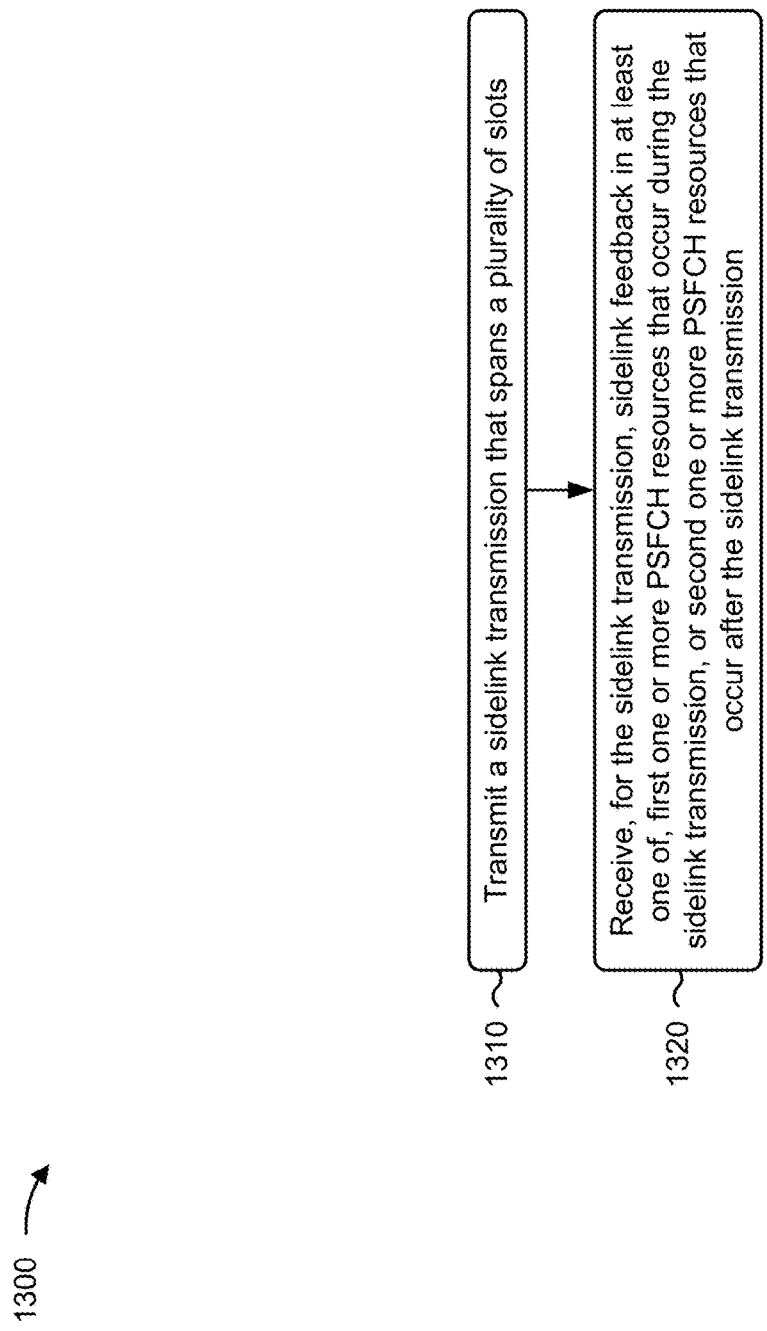

FIG. 13 is a diagram illustrating an example process 1300 performed, for example, by a UE, in accordance with the present disclosure. Example process 1300 is an example where the UE (e.g., UE 120) performs operations associated with feedback for sidelink transmissions.

As shown in FIG. 13, in some aspects, process 1300 may include transmitting a sidelink transmission that spans a plurality of slots (block 1310). For example, the UE (e.g., using communication manager 140 and/or transmission component 1704, depicted in FIG. 17) may transmit a sidelink transmission that spans a plurality of slots, as described above.

As further shown in FIG. 13, in some aspects, process 1300 may include receiving, for the sidelink transmission, sidelink feedback in at least one of: first one or more PSFCH resources that occur during the sidelink transmission, or second one or more PSFCH resources that occur after the sidelink transmission (block 1320). For example, the UE (e.g., using communication manager 140 and/or reception component 1702, depicted in FIG. 17) may receive, for the sidelink transmission, sidelink feedback in at least one of: first one or more PSFCH resources that occur during the sidelink transmission, or second one or more PSFCH resources that occur after the sidelink transmission, as described above.

Process 1300 may include additional aspects, such as any single aspect or any combination of aspects described below and/or in connection with one or more other processes described elsewhere herein.

In a first aspect, and with respect to process 1300, receiving the sidelink feedback comprises receiving a single sidelink feedback for the sidelink transmission in a PSFCH resource of the second one or more PSFCH resources that occur after the sidelink transmission, wherein the PSFCH resource occurs after a last slot of the plurality of slots.

In a second aspect, alone or in combination with the first aspect, and with respect to process 1300, receiving the sidelink feedback comprises receiving respective sidelink feedbacks for each slot of the plurality of slots in which the sidelink transmission was transmitted.

In a third aspect, alone or in combination with one or more of the first and second aspects, and with respect to process 1300, receiving the sidelink feedback comprises receiving a first subset of respective sidelink feedbacks, for each slot of the plurality of slots in which the sidelink transmission was transmitted, in the first one or more PSFCH resources that occur during the sidelink transmission, wherein the first subset of the respective sidelink feedbacks is associated with a first subset of the plurality of slots that occur prior to a slot in which the first one or more PSFCH resources are located, and receiving a second subset of the respective sidelink feedbacks in the second one or more PSFCH resources that occur after the sidelink transmission, wherein the second subset of the respective sidelink feedbacks is associated with a second subset of the plurality of slots that occur at least one of: prior to the slot in which the first one or more PSFCH resources are located, during the slot in which the first one or more PSFCH resources are located, or after the slot in which the first one or more PSFCH resources are located.

In a fourth aspect, alone or in combination with one or more of the first through third aspects, and with respect to process 1300, process 1300 includes transmitting an indication of a feedback configuration in a header of the sidelink transmission, wherein the feedback configuration indicates at least one of a quantity of sidelink feedbacks that are to be provided for the sidelink transmission, or a feedback granularity for the sidelink feedback.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
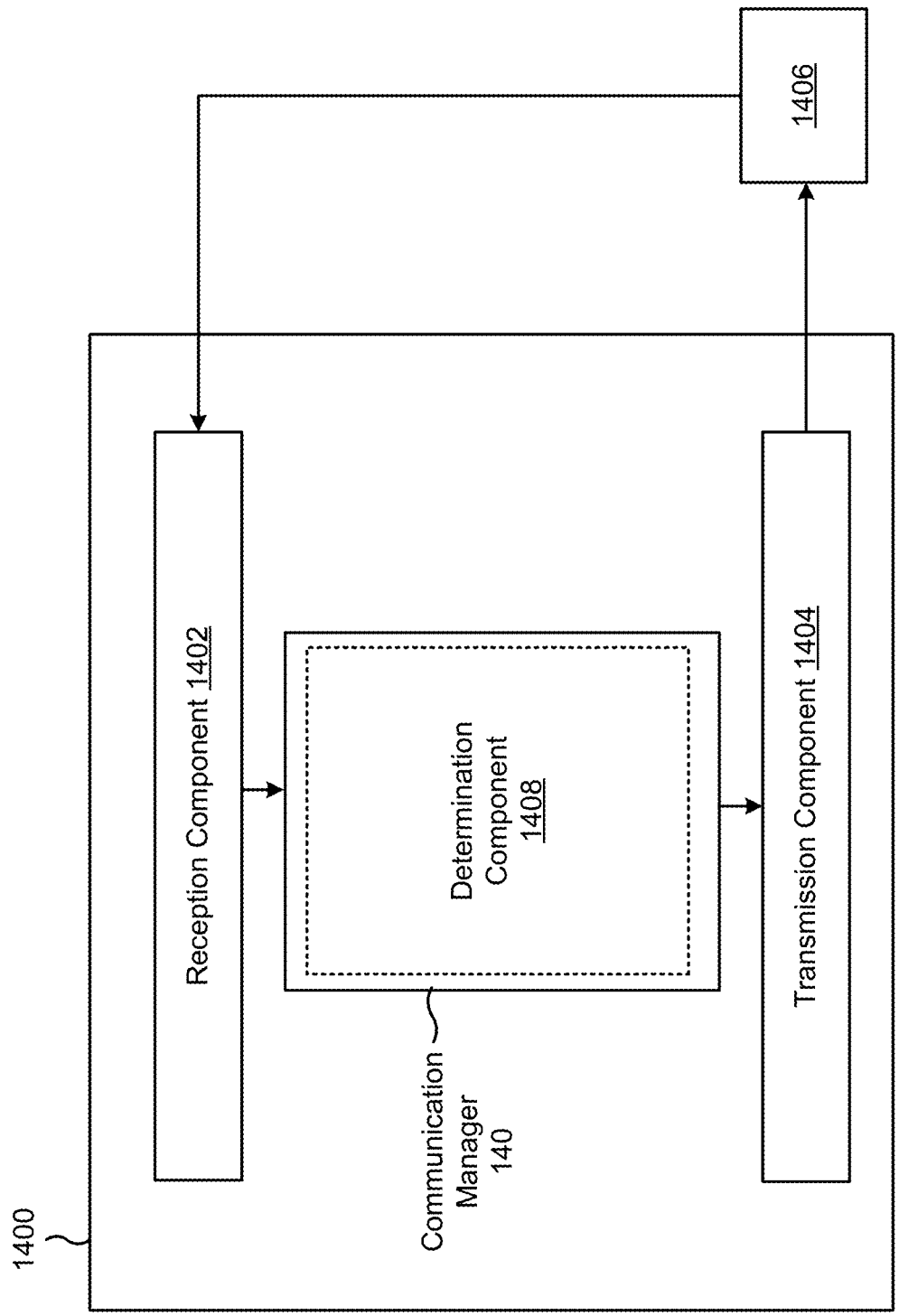
FIGS. 14-17 are diagrams of example apparatuses for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a determination component 1408, among other examples.

In some aspects, the apparatus 1400 may be configured to perform one or more operations described herein in connection with FIGS. 6-9. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive (e.g., from the apparatus 1406) a sidelink transmission that includes a transport block. The transmission component 1404 may transmit (e.g., to the apparatus 1406) sidelink feedback, for each of a plurality of code block groups included in the transport block, in respective PSFCH resources.

The determination component 1408 may determine an index of a PSFCH resource, of the respective PSFCH resources, for a code block group of the plurality of code block groups based at least in part on a physical layer source identifier associated with the sidelink transmission, and an offset value associated with the code block group.

The transmission component 1404 may transmit transport-block-level sidelink feedback for the transport block in another PSFCH resource.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
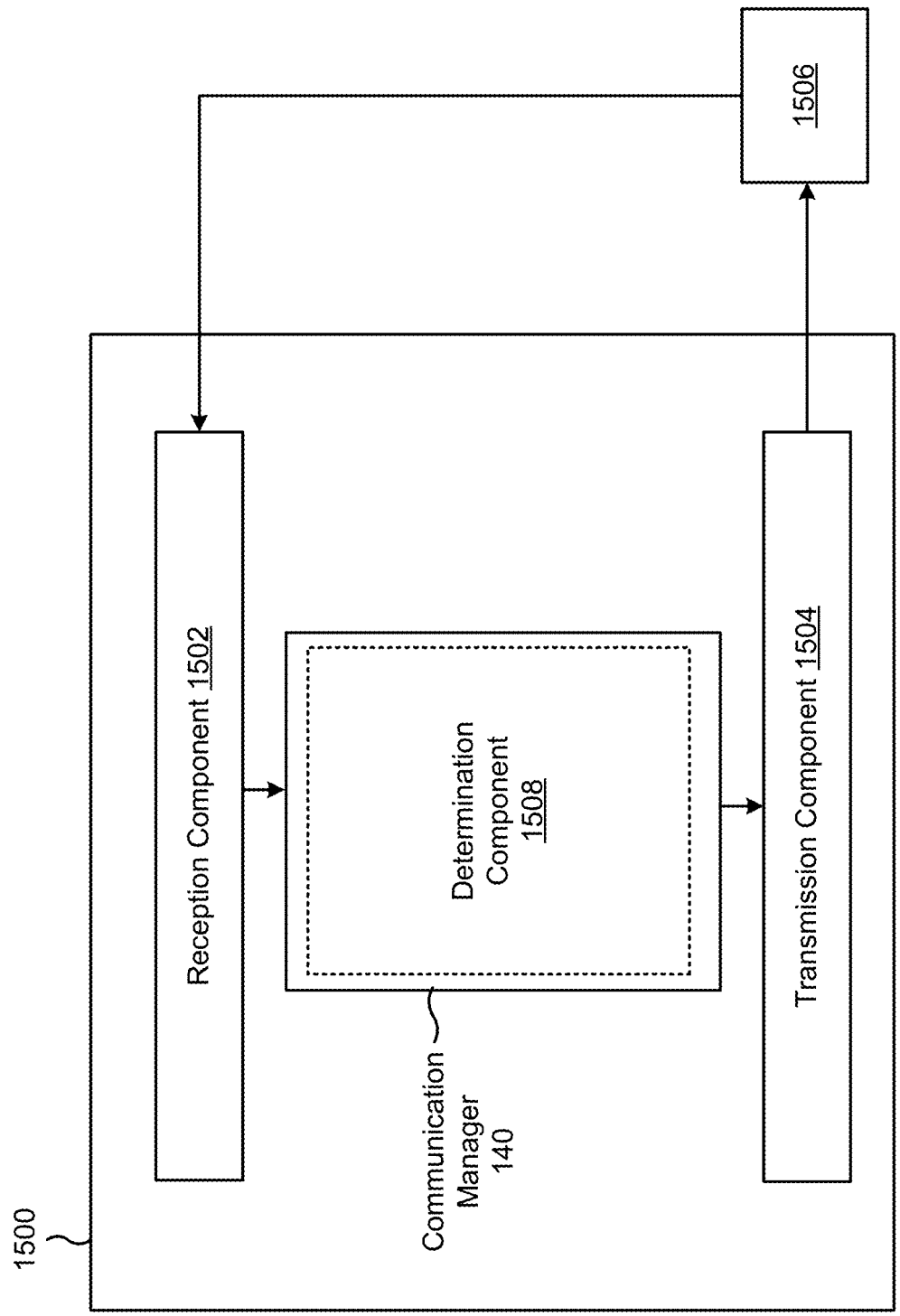

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a determination component 1508.

In some aspects, the apparatus 1500 may be configured to perform one or more operations described herein in connection with FIGS. 6-9. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The transmission component 1504 may transmit (e.g., to the apparatus 1506) a sidelink transmission that includes a transport block. The reception component 1502 may receive (e.g., from the apparatus 1506) sidelink feedback, for each of a plurality of code block groups included in the transport block, in respective PSFCH resources.

The determination component 1508 may determine an index of a PSFCH resource, of the respective PSFCH resources, for a code block group of the plurality of code block groups based at least in part on a physical layer source identifier associated with the sidelink transmission, and an offset value associated with the code block group.

The reception component 1502 may receive transport-block-level sidelink feedback for the transport block in another PSFCH resource.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
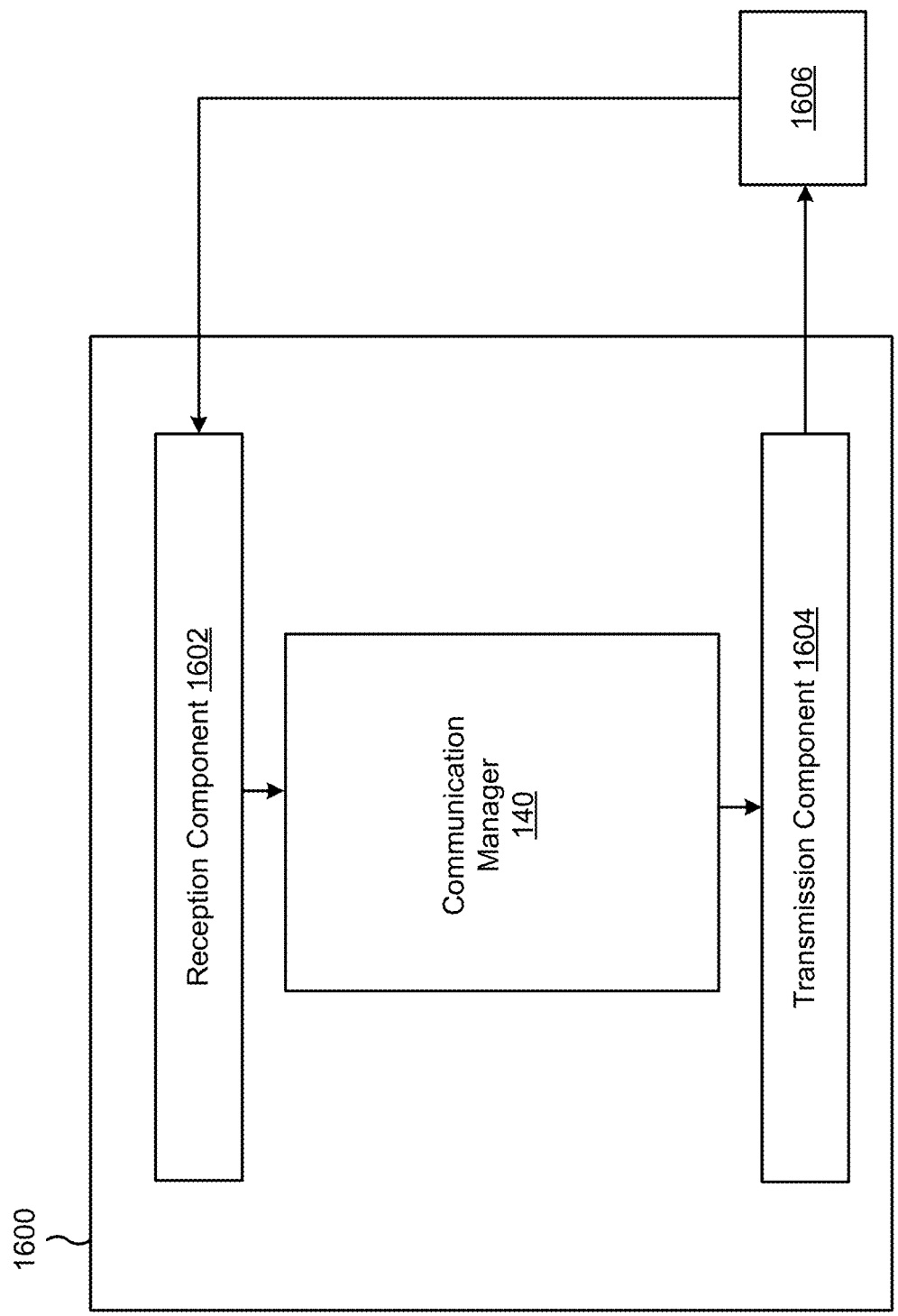

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140.

In some aspects, the apparatus 1600 may be configured to perform one or more operations described herein in connection with FIGS. 6-9. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive (e.g., from the apparatus 1606) a sidelink transmission that spans a plurality of slots. The transmission component 1604 may transmit (e.g., from the apparatus 1606), for the sidelink transmission, sidelink feedback in at least one of: first one or more PSFCH resources that occur during the sidelink transmission, or second one or more PSFCH resources that occur after the sidelink transmission.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
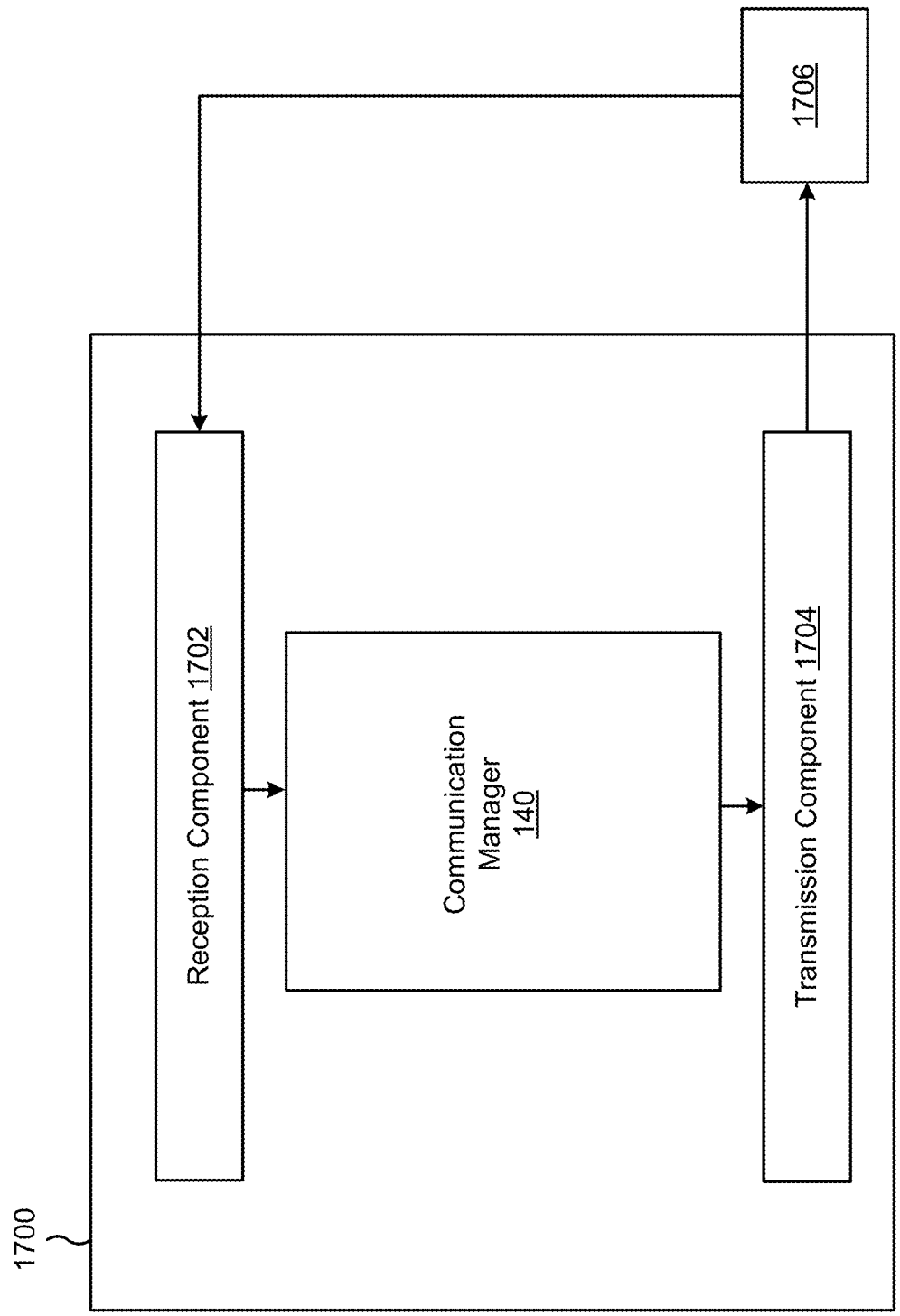

FIG. 17 is a diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140.

In some aspects, the apparatus 1700 may be configured to perform one or more operations described herein in connection with FIGS. 6-9. Additionally, or alternatively, the apparatus 1700 may be configured to perform one or more processes described herein, such as process 1300 of FIG. 13. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE described in connection with FIG. 2. In some aspects, the transmission component 1704 may be co-located with the reception component 1702 in a transceiver.

The transmission component 1704 may transmit (e.g., to the apparatus 1706) a sidelink transmission that spans a plurality of slots. The reception component 1702 may receive (e.g., from the apparatus 1706), for the sidelink transmission, sidelink feedback in at least one of: first one or more PSFCH resources that occur during the sidelink transmission, or second one or more PSFCH resources that occur after the sidelink transmission.

The transmission component 1704 may transmit an indication of a feedback configuration in a header of the sidelink transmission, wherein the feedback configuration indicates at least one of: a quantity of sidelink feedbacks that are to be provided for the sidelink transmission, or a feedback granularity for the sidelink feedback.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving a sidelink transmission that includes a transport block; and transmitting sidelink feedback, for each of a plurality of code block groups included in the transport block, in respective physical sidelink feedback channel (PSFCH) resources.

Aspect 2: The method of Aspect 1, wherein the respective PSFCH resources comprise respective code-frequency resources.

Aspect 3: The method of Aspect 1 or 2, wherein the respective PSFCH resources comprise respective frequency-only resources.

Aspect 4: The method of one or more of Aspects 1-3, wherein a PSFCH resource, of the respective PSFCH resources, comprises a physical resource block that includes a pair of cyclic shifts, wherein a first cyclic shift of the pair of cyclic shifts is configured for indicating an acknowledgement of an associated code block group of the plurality of code block groups, and wherein a second cyclic shift of the pair of cyclic shifts is configured for indicating a negative acknowledgement of the associated code block group.

Aspect 5: The method of one or more of Aspects 1-4, wherein transmitting the sidelink feedback for each of the plurality of code block groups comprises: transmitting the sidelink feedback for each of the plurality of code block groups based at least in part on at least one of: a configuration, a transmission priority associated with the sidelink transmission, or a transmission type associated with the sidelink transmission.

Aspect 6: The method of one or more of Aspects 1-5, further comprising: determining an index of a PSFCH resource, of the respective PSFCH resources, for a code block group of the plurality of code block groups based at least in part on: a physical layer source identifier associated with the sidelink transmission, and an offset value associated with the code block group.

Aspect 7: The method of Aspect 6, wherein determining the index of the PSFCH resource comprises: determining the index of the PSFCH resource based at least in part on an identifier associated with the UE.

Aspect 8: The method of one or more of Aspects 1-7, further comprising: transmitting transport-block-level sidelink feedback for the transport block in another PSFCH resource.

Aspect 9: The method of one or more of Aspects 1-8, wherein the sidelink transmission comprises a groupcast sidelink transmission; and wherein the respective PSFCH resources are included in a plurality of PSFCH resources for group members associated with the groupcast sidelink transmission.

Aspect 10: A method of wireless communication performed by a user equipment (UE), comprising: transmitting a sidelink transmission that includes a transport block; and receiving sidelink feedback, for each of a plurality of code block groups included in the transport block, in respective physical sidelink feedback channel (PSFCH) resources.

Aspect 11: The method of Aspect 10, wherein the respective PSFCH resources comprise respective code-frequency resources.

Aspect 12: The method of Aspect 10 or 11, wherein the respective PSFCH resources comprise respective frequency-only resources.

Aspect 13: The method of one or more of Aspects 10-12, wherein a PSFCH resource, of the respective PSFCH resources, comprises a physical resource block that includes a pair of cyclic shifts, wherein a first cyclic shift of the pair of cyclic shifts is configured for indicating an acknowledgement of an associated code block group of the plurality of code block groups, and wherein a second cyclic shift of the pair of cyclic shifts is configured for indicating a negative acknowledgement of the associated code block group.

Aspect 14: The method of one or more of Aspects 10-13, wherein receiving the sidelink feedback for each of the plurality of code block groups comprises: receiving the sidelink feedback for each of the plurality of code block groups based at least in part on at least one of: a configuration, a transmission priority associated with the sidelink transmission, or a transmission type associated with the sidelink transmission.

Aspect 15: The method of one or more of Aspects 10-14, further comprising: determining an index of a PSFCH resource, of the respective PSFCH resources, for a code block group of the plurality of code block groups based at least in part on: a physical layer source identifier associated with the sidelink transmission, and an offset value associated with the code block group.

Aspect 16: The method of Aspect 15, wherein determining the index of the PSFCH resource comprises: determining the index of the PSFCH resource based at least in part on an identifier associated with another UE that transmitted the sidelink feedback.

Aspect 17: The method of one or more of Aspects 10-16, further comprising: receiving transport-block-level sidelink feedback for the transport block in another PSFCH resource.

Aspect 18: The method of one or more of Aspects 10-17, wherein the sidelink transmission comprises a groupcast sidelink transmission; and wherein the respective PSFCH resources are included in a plurality of PSFCH resources for group members associated with the groupcast sidelink transmission.

Aspect 19: A method of wireless communication performed by a user equipment (UE), comprising: receiving a sidelink transmission that spans a plurality of slots; and transmitting, for the sidelink transmission, sidelink feedback in at least one of: first one or more physical sidelink feedback channel (PSFCH) resources that occur during the sidelink transmission, or second one or more PSFCH resources that occur after the sidelink transmission.

Aspect 20: The method of Aspect 19, wherein transmitting the sidelink feedback comprises: transmitting a single sidelink feedback for the sidelink transmission in a PSFCH resource of the second one or more PSFCH resources that occur after the sidelink transmission, wherein the PSFCH resource occurs after a last slot of the plurality of slots.

Aspect 21: The method of Aspect 20, wherein the PSFCH resource occurs at least a threshold quantity of slots after the last slot of the plurality of slots.

Aspect 22: The method of one or more of Aspects 19-21, wherein transmitting the sidelink feedback comprises: transmitting respective sidelink feedbacks for each slot of the plurality of slots in which the sidelink transmission was transmitted.

Aspect 23: The method of Aspect 22, wherein transmitting the respective sidelink feedbacks comprises: transmitting the respective sidelink feedbacks in the second one or more PSFCH resources that occur after the sidelink transmission.

Aspect 24: The method of Aspect 22 or 23, wherein transmitting the respective sidelink feedbacks comprises: transmitting a first subset of the respective sidelink feedbacks in the first one or more PSFCH resources that occur during the sidelink transmission, wherein the first subset of the respective sidelink feedbacks is associated with a first subset of the plurality of slots that occur prior to a slot in which the first one or more PSFCH resources are located; and transmitting a second subset of the respective sidelink feedbacks in the second one or more PSFCH resources that occur after the sidelink transmission, wherein the second subset of the respective sidelink feedbacks is associated with a second subset of the plurality of slots that occur at least one of: prior to the slot in which the first one or more PSFCH resources are located, during the slot in which the first one or more PSFCH resources are located, or after the slot in which the first one or more PSFCH resources are located.

Aspect 25: The method of Aspect 19, wherein transmitting the sidelink feedback comprises: transmitting the sidelink feedback based at least in part on a feedback configuration indicated in a header of the sidelink transmission, wherein the feedback configuration indicates at least one of: a quantity of sidelink feedbacks that are to be provided for the sidelink transmission, or a feedback granularity for the sidelink feedback.

Aspect 26: A method of wireless communication performed by a user equipment (UE), comprising: transmitting a sidelink transmission that spans a plurality of slots; and receiving, for the sidelink transmission, sidelink feedback in at least one of: first one or more physical sidelink feedback channel (PSFCH) resources that occur during the sidelink transmission, or second one or more PSFCH resources that occur after the sidelink transmission.

Aspect 27: The method of Aspect 26, wherein receiving the sidelink feedback comprises: receiving a single sidelink feedback for the sidelink transmission in a PSFCH resource of the second one or more PSFCH resources that occur after the sidelink transmission, wherein the PSFCH resource occurs after a last slot of the plurality of slots.

Aspect 28: The method of Aspect 26 or 27, wherein receiving the sidelink feedback comprises: receiving respective sidelink feedbacks for each slot of the plurality of slots in which the sidelink transmission was transmitted.

Aspect 29: The method of one or more of Aspects 26-28, wherein receiving the sidelink feedback comprises: receiving a first subset of respective sidelink feedbacks, for each slot of the plurality of slots in which the sidelink transmission was transmitted, in the first one or more PSFCH resources that occur during the sidelink transmission, wherein the first subset of the respective sidelink feedbacks is associated with a first subset of the plurality of slots that occur prior to a slot in which the first one or more PSFCH resources are located; and receiving a second subset of the respective sidelink feedbacks in the second one or more PSFCH resources that occur after the sidelink transmission, wherein the second subset of the respective sidelink feedbacks is associated with a second subset of the plurality of slots that occur at least one of: prior to the slot in which the first one or more PSFCH resources are located, during the slot in which the first one or more PSFCH resources are located, or after the slot in which the first one or more PSFCH resources are located.

Aspect 30: The method of one or more of Aspects 26-28, further comprising: transmitting an indication of a feedback configuration in a header of the sidelink transmission, wherein the feedback configuration indicates at least one of: a quantity of sidelink feedbacks that are to be provided for the sidelink transmission, or a feedback granularity for the sidelink feedback.

Aspect 31: An apparatus for wireless communication at a device, comprising a processor; memory coupled with the processor; and instructions stored in the memory and executable by the processor to cause the apparatus to perform the method of one or more of Aspects 1-9.

Aspect 32: A device for wireless communication, comprising a memory and one or more processors coupled to the memory, the one or more processors configured to perform the method of one or more of Aspects 1-9.

Aspect 33: An apparatus for wireless communication, comprising at least one means for performing the method of one or more of Aspects 1-9.

Aspect 34: A non-transitory computer-readable medium storing code for wireless communication, the code comprising instructions executable by a processor to perform the method of one or more of Aspects 1-9.

Aspect 35: A non-transitory computer-readable medium storing a set of instructions for wireless communication, the set of instructions comprising one or more instructions that, when executed by one or more processors of a device, cause the device to perform the method of one or more of Aspects 1-9.

Aspect 36: An apparatus for wireless communication at a device, comprising a processor; memory coupled with the processor; and instructions stored in the memory and executable by the processor to cause the apparatus to perform the method of one or more of Aspects 10-18.

Aspect 37: A device for wireless communication, comprising a memory and one or more processors coupled to the memory, the one or more processors configured to perform the method of one or more of Aspects 10-18.

Aspect 38: An apparatus for wireless communication, comprising at least one means for performing the method of one or more of Aspects 10-18.

Aspect 39: A non-transitory computer-readable medium storing code for wireless communication, the code comprising instructions executable by a processor to perform the method of one or more of Aspects 10-18.

Aspect 40: A non-transitory computer-readable medium storing a set of instructions for wireless communication, the set of instructions comprising one or more instructions that, when executed by one or more processors of a device, cause the device to perform the method of one or more of Aspects 10-18.

Aspect 41: An apparatus for wireless communication at a device, comprising a processor; memory coupled with the processor; and instructions stored in the memory and executable by the processor to cause the apparatus to perform the method of one or more of Aspects 19-25.

Aspect 42: A device for wireless communication, comprising a memory and one or more processors coupled to the memory, the one or more processors configured to perform the method of one or more of Aspects 19-25.

Aspect 43: An apparatus for wireless communication, comprising at least one means for performing the method of one or more of Aspects 19-25.

Aspect 44: A non-transitory computer-readable medium storing code for wireless communication, the code comprising instructions executable by a processor to perform the method of one or more of Aspects 19-25.

Aspect 45: A non-transitory computer-readable medium storing a set of instructions for wireless communication, the set of instructions comprising one or more instructions that, when executed by one or more processors of a device, cause the device to perform the method of one or more of Aspects 19-25.

Aspect 46: An apparatus for wireless communication at a device, comprising a processor; memory coupled with the processor; and instructions stored in the memory and executable by the processor to cause the apparatus to perform the method of one or more of Aspects 26-30.

Aspect 47: A device for wireless communication, comprising a memory and one or more processors coupled to the memory, the one or more processors configured to perform the method of one or more of Aspects 26-30.

Aspect 48: An apparatus for wireless communication, comprising at least one means for performing the method of one or more of Aspects 26-30.

Aspect 49 A non-transitory computer-readable medium storing code for wireless communication, the code comprising instructions executable by a processor to perform the method of one or more of Aspects 26-30.

Aspect 50: A non-transitory computer-readable medium storing a set of instructions for wireless communication, the set of instructions comprising one or more instructions that, when executed by one or more processors of a device, cause the device to perform the method of one or more of Aspects 26-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a sidelink transmission that includes a transport block including a plurality of code block groups,
      wherein an index of a physical sidelink feedback channel (PSFCH) resource, of respective PSFCH resources, for a code block group of the plurality of code block groups is based at least in part on:
         a physical layer source identifier associated with the sidelink transmission, and
         an offset value corresponding to an index of the code block group,
      wherein each code block group of the plurality of code block groups is mapped to different PSFCH resource of the respective PSFCH resources; and
   transmitting sidelink feedback, for each of the plurality of code block groups, in the respective PSFCH resources.

2. The method of claim 1, wherein the respective PSFCH resources comprise respective code-frequency resources.

3. The method of claim 1, wherein the respective PSFCH resources comprise respective frequency-only resources.

4. The method of claim 1, wherein the PSFCH resource comprises a physical resource block that includes a pair of cyclic shifts,
   wherein a first cyclic shift of the pair of cyclic shifts is configured for indicating an acknowledgement of an associated code block group of the plurality of code block groups, and
   wherein a second cyclic shift of the pair of cyclic shifts is configured for indicating a negative acknowledgement of the associated code block group.

5. The method of claim 1, wherein transmitting the sidelink feedback for each of the plurality of code block groups comprises:
transmitting the sidelink feedback for each of the plurality of code block groups based at least in part on at least one of:
a received configuration that enables or disables code block group based feedback reporting,
a transmission priority associated with the sidelink transmission satisfying a priority threshold, or
a transmission type associated with the sidelink transmission being one of a unicast transmission, a multicast transmission, or a groupcast transmission.

6. The method of claim 1, further comprising:
determining the index of the PSFCH resource for the code block group based at least in part on:
the physical layer source identifier, and
the offset value.

7. The method of claim 6, wherein determining the index of the PSFCH resource comprises:
determining the index of the PSFCH resource based at least in part on an identifier associated with the UE.

8. The method of claim 1, further comprising:
transmitting transport-block-level sidelink feedback for the transport block in another PSFCH resource.

9. The method of claim 1, wherein the sidelink transmission comprises a groupcast sidelink transmission; and
wherein the respective PSFCH resources are included in a plurality of PSFCH resources for group members associated with the groupcast sidelink transmission.

10. A method of wireless communication performed by a user equipment (UE), comprising:
transmitting a sidelink transmission that includes a transport block including a plurality of code block groups,
wherein an index of a physical sidelink feedback channel (PSFCH) resource, of respective PSFCH resources, for a code block group of the plurality of code block groups is based at least in part on:
a physical layer source identifier associated with the sidelink transmission, and
an offset value corresponding to an index of the code block group,
wherein each code block group of the plurality of code block groups is mapped to different PSFCH resource of the respective PSFCH resources; and
receiving sidelink feedback, for each of the plurality of code block groups, in the respective PSFCH resources.

11. The method of claim 10, wherein the respective PSFCH resources comprise respective code-frequency resources.

12. The method of claim 10, wherein the respective PSFCH resources comprise respective frequency-only resources.

13. The method of claim 10, wherein the PSFCH resource comprises a physical resource block that includes a pair of cyclic shifts,
wherein a first cyclic shift of the pair of cyclic shifts is configured for indicating an acknowledgement of an associated code block group of the plurality of code block groups, and
wherein a second cyclic shift of the pair of cyclic shifts is configured for indicating a negative acknowledgement of the associated code block group.

14. The method of claim 10, wherein receiving the sidelink feedback for each of the plurality of code block groups comprises:
receiving the sidelink feedback for each of the plurality of code block groups based at least in part on at least one of:
a received configuration that enables or disables code block group based feedback reporting,
a transmission priority associated with the sidelink transmission satisfying a priority threshold, or
a transmission type associated with the sidelink transmission being one of a unicast transmission, a multicast transmission, or a groupcast transmission.

15. The method of claim 10, further comprising:
determining the index of the PSFCH resource for the code block group based at least in part on:
the physical layer source identifier, and
the offset value.

16. The method of claim 15, wherein determining the index of the PSFCH resource comprises:
determining the index of the PSFCH resource based at least in part on an identifier associated with another UE that transmitted the sidelink feedback.

17. The method of claim 10, further comprising:
receiving transport-block-level sidelink feedback for the transport block in another PSFCH resource.

18. The method of claim 10, wherein the sidelink transmission comprises a groupcast sidelink transmission; and
wherein the respective PSFCH resources are included in a plurality of PSFCH resources for group members associated with the groupcast sidelink transmission.

19. A user equipment (UE) for wireless communication, comprising:
one or more memories; and
one or more processors, coupled to the one or more memories, configured to cause the UE to:
receive a sidelink transmission that includes a transport block including a plurality of code block groups,
wherein an index of a physical sidelink feedback channel (PSFCH) resource, of respective PSFCH resources, for a code block group of the plurality of code block groups is based at least in part on:
a physical layer source identifier associated with the sidelink transmission, and
an offset value corresponding to an index of the code block group,
wherein each code block group of the plurality of code block groups is mapped to different PSFCH resource of the respective PSFCH resources; and
transmit sidelink feedback, for each of the plurality of code block groups, in the respective PSFCH resources.

20. The UE of claim 19, wherein the respective PSFCH resources comprise respective code-frequency resources.

21. The UE of claim 19, wherein the respective PSFCH resources comprise respective frequency-only resources.

22. The UE of claim 19, wherein the PSFCH resource comprises a physical resource block that includes a pair of cyclic shifts,
wherein a first cyclic shift of the pair of cyclic shifts is configured for indicating an acknowledgement of an associated code block group of the plurality of code block groups, and
wherein a second cyclic shift of the pair of cyclic shifts is configured for indicating a negative acknowledgement of the associated code block group.

23. The UE of claim 19, wherein the one or more processors, to cause the UE to transmit the sidelink feedback for each of the plurality of code block groups, are configured to cause the UE to:
transmit the sidelink feedback for each of the plurality of code block groups based at least in part on at least one of:
a received configuration that enables or disables code block group based feedback reporting,
a transmission priority associated with the sidelink transmission satisfying a priority threshold, or
a transmission type associated with the sidelink transmission being one of a unicast transmission, a multicast transmission, or a groupcast transmission.

24. A user equipment (UE) for wireless communication, comprising:
one or more memories; and
one or more processors, coupled to the one or more memories, configured to cause the UE to:
transmit a sidelink transmission that includes a transport block including a plurality of code block groups,
wherein an index of a physical sidelink feedback channel (PSFCH) resource, of respective PSFCH resources, for a code block group of the plurality of code block groups is based at least in part on:
a physical layer source identifier associated with the sidelink transmission, and
an offset value corresponding to an index of the code block group, wherein each code block group of the plurality of code block groups is mapped to different PSFCH resource of the respective PSFCH resources; and
receive sidelink feedback, for each of the plurality of code block groups, in the respective PSFCH resources.

25. The UE of claim 24, wherein the respective PSFCH resources comprise respective code-frequency resources.

26. The UE of claim 24, wherein the respective PSFCH resources comprise respective frequency-only resources.

27. The UE of claim 24, wherein the PSFCH resource comprises a physical resource block that includes a pair of cyclic shifts,
wherein a first cyclic shift of the pair of cyclic shifts is configured for indicating an acknowledgement of an associated code block group of the plurality of code block groups, and
wherein a second cyclic shift of the pair of cyclic shifts is configured for indicating a negative acknowledgement of the associated code block group.

28. The UE of claim 24, wherein the one or more processors, to receive the sidelink feedback for each of the plurality of code block groups, are configured to:
receive the sidelink feedback for each of the plurality of code block groups based at least in part on at least one of:
a received configuration that enables or disables code block group based feedback reporting,
a transmission priority associated with the sidelink transmission satisfying a priority threshold, or
a transmission type associated with the sidelink transmission being one of a unicast transmission, a multicast transmission, or a groupcast transmission.

29. The UE of claim 24, wherein the one or more processors are further configured to:
determine the index of the PSFCH resource for the code block group based at least in part on:
the physical layer source identifier, and
the offset value.

30. The UE of claim 24, wherein the one or more processors are further configured to:
receive transport-block-level sidelink feedback for the transport block in another PSFCH resource.

* * * * *